(12) United States Patent
Akopyan

(10) Patent No.: US 7,846,369 B2
(45) Date of Patent: Dec. 7, 2010

(54) APPARATUS AND METHOD FOR MOLDING POLYMER PARTS BY DISPLACEMENT INJECTION MOLDING

(76) Inventor: Razmik L. Akopyan, 16076 S. Avalon St., Olathe, KS (US) 66062

( * ) Notice: Subject to any disclaimer, the term of this patent is extended or adjusted under 35 U.S.C. 154(b) by 100 days.

(21) Appl. No.: 11/830,767

(22) Filed: Jul. 30, 2007

(65) Prior Publication Data

US 2008/0217815 A1    Sep. 11, 2008

Related U.S. Application Data

(63) Continuation-in-part of application No. 11/391,999, filed on Mar. 29, 2006, now abandoned.

(60) Provisional application No. 60/938,974, filed on May 18, 2007.

(51) Int. Cl.
*B29C 45/56* (2006.01)
(52) U.S. Cl. .............. 264/314; 264/328.7; 264/328.12
(58) Field of Classification Search .............. 264/314, 264/238.7, 328.12, 328.7
See application file for complete search history.

(56) References Cited

U.S. PATENT DOCUMENTS

| | | | |
|---|---|---|---|
| 2,501,595 A | 3/1950 | Bohannon | |
| 3,787,159 A * | 1/1974 | Bielfeldt | 425/167 |
| 3,843,293 A | 10/1974 | Harville | |
| 3,844,699 A | 10/1974 | Maxwell | |
| 3,999,736 A | 12/1976 | Theodorsen | |
| 4,033,485 A | 7/1977 | Kohler | |
| 4,091,057 A | 5/1978 | Weber | |
| 4,094,952 A | 6/1978 | Frank | |
| 4,364,878 A | 12/1982 | Laliberte et al. | |
| 4,409,169 A | 10/1983 | Bartholdsten et al. | |
| 4,442,061 A | 4/1984 | Matsuda et al. | |
| 4,489,033 A * | 12/1984 | Uda et al. | 264/328.7 |
| 4,519,763 A | 5/1985 | Matsuda et al. | |
| 4,760,228 A * | 7/1988 | Kudo | 219/686 |
| 4,900,242 A | 2/1990 | Maus et al. | |
| 4,965,028 A | 10/1990 | Maus et al. | |
| 5,922,266 A | 7/1999 | Grove | |
| 5,968,439 A | 10/1999 | Grove | |
| 6,010,656 A | 1/2000 | Nomura et al. | |
| 6,109,909 A | 8/2000 | Morita | |
| 6,129,870 A | 10/2000 | Hettinga | |
| 6,276,656 B1 * | 8/2001 | Baresich | 249/79 |
| 6,409,491 B1 | 6/2002 | Leffew et al. | |

(Continued)

FOREIGN PATENT DOCUMENTS

EP    0495112 A1    7/1991

*Primary Examiner*—Khanh Nguyen
*Assistant Examiner*—Vishal I Patel
(74) *Attorney, Agent, or Firm*—Erickson, Kernell, Derusseau & Kleypas, LLC

(57) ABSTRACT

A displacement-injection molding system utilizes a plasticizing vessel with cylindrical heat transfer cores extending into the cavity of the plasticizing vessel to efficiently heat polymer granules to their injection temperature and a variable volume mold utilizing back pressure to maintain the injected polymer under pressure. A plunger for ejecting polymer from the plasticizing vessel incorporates openings for receiving the cylindrical cores. The plasticizing vessel is preferably sized to receive at least two shot sizes of polymer material to permit continuous heating of the granules of plastic material between shots as additional granules are added to replace the ejected material.

6 Claims, 18 Drawing Sheets

U.S. PATENT DOCUMENTS

| | | |
|---|---|---|
| 6,457,917 B1 | 10/2002 | Nomura et al. |
| 6,998,076 B2 | 2/2006 | Ohshiro |
| 7,041,247 B2 | 5/2006 | Nagaoka et al. |
| 7,090,800 B2 | 8/2006 | Clarke |
| 7,104,781 B2 | 9/2006 | Iwata et al. |
| 2002/0024169 A1* | 2/2002 | Nishizawa et al. .......... 264/429 |
| 2004/0109919 A1 | 6/2004 | Clarke |
| 2006/0058910 A1* | 3/2006 | McBain et al. .............. 700/197 |

* cited by examiner

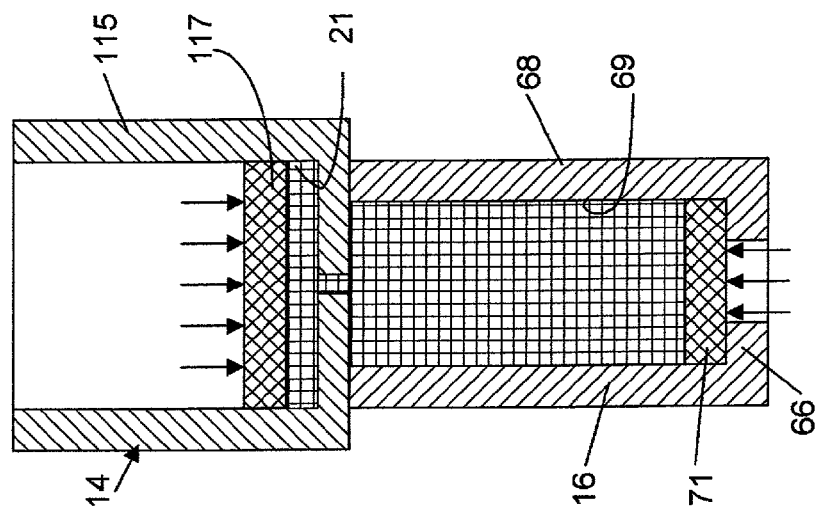
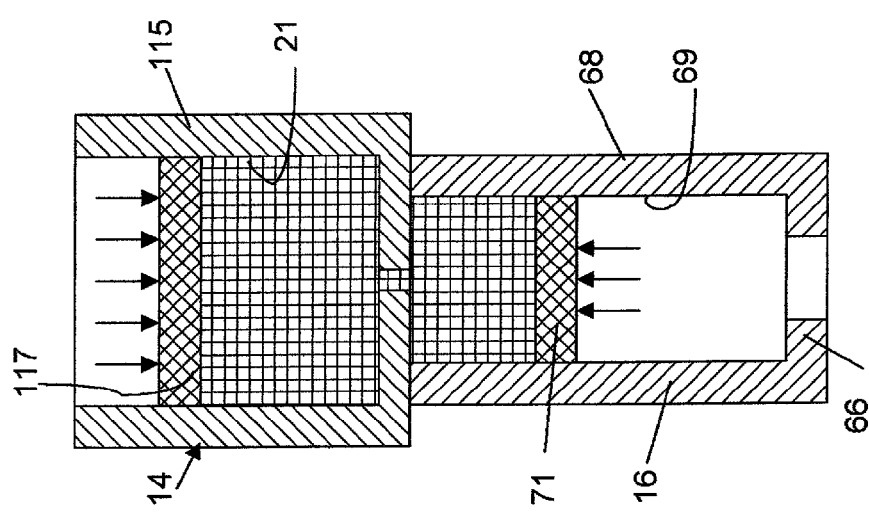
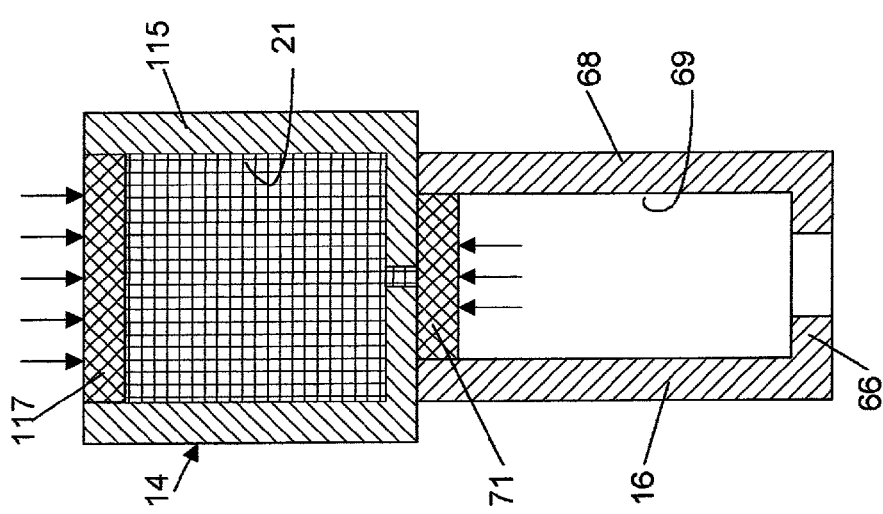
Fig. 10c
Fig. 10b
Fig. 10a

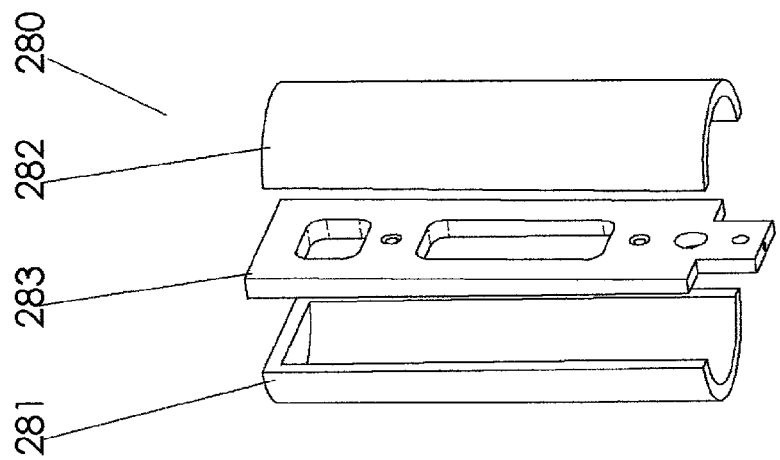
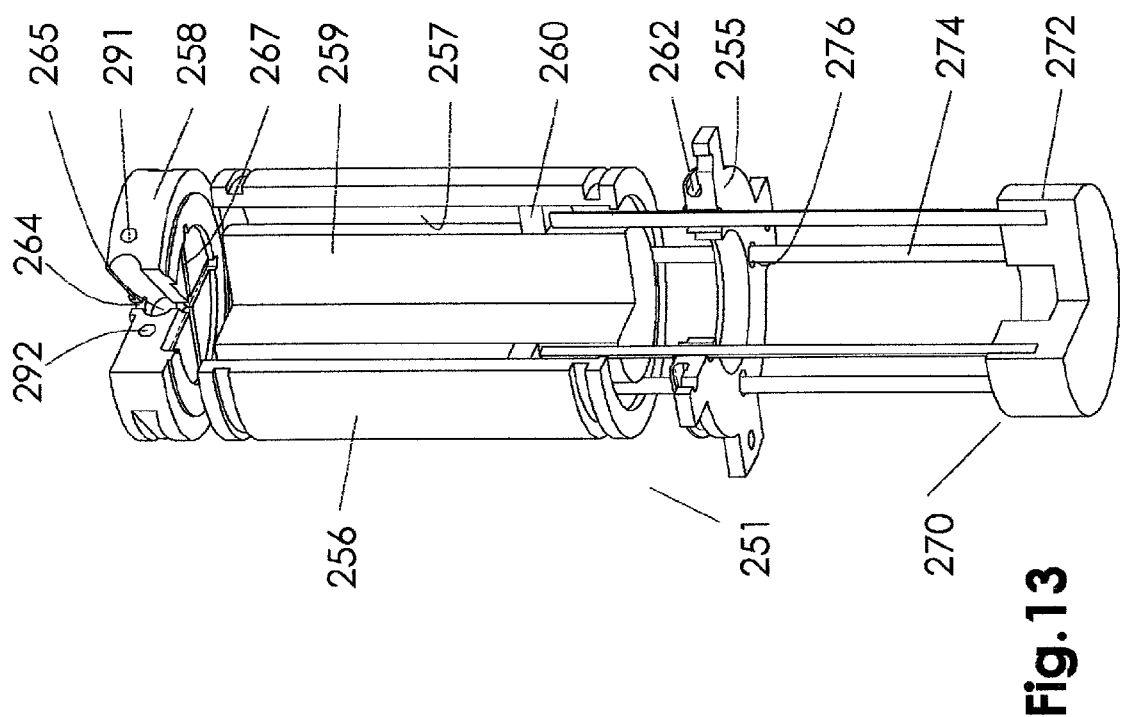
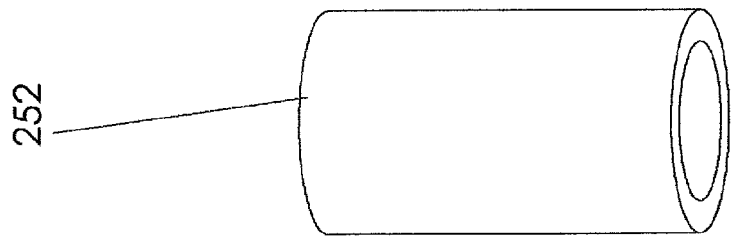

APPARATUS AND METHOD FOR MOLDING POLYMER PARTS BY DISPLACEMENT INJECTION MOLDING

CROSS-REFERENCE TO RELATED APPLICATIONS

This U.S. patent application is a continuation in part of and claims the benefit under 35 U.S.C. 120 of the filing date of U.S. patent application Ser. No. 11/391,999 filed Mar. 29, 2006. This application also claims the benefit of the filing date of co-pending provisional application Ser. No. 60/938,974 filed May 18, 2007.

BACKGROUND OF THE INVENTION

This invention relates to systems and processes for molding relatively thick walled articles form fiber reinforced thermoplastics which perform at extremely high temperatures and stresses. The processes and apparatus disclosed herein may also be utilized for molding of thermoset resins.

In my issued US patents, including U.S. Pat. No. 6,984,352 and U.S. Pat. No. 7,223,087, I disclose methods for creating compression molds for use in the compression molding of polymers using microwave energy to heat the polymer material to its melting point. The molds and processes disclosed therein are particularly well adapted for molding plastic polymers and composites having a relatively high operating temperature, including such high performance polymers as those sold under the trademarks PEEK®, TORLON®, SEMITRON®, DURATRON®, CELAZOLE®.

In my U.S. Pat. No. 7,122,146, I disclosed methods and apparatus for injection molding of polymers utilizing microwave energy. This process is intended for molding thick walled parts from polymer in the form of pellets or powders, which provides a higher quality molded product compared to parts molded by compression molding. The mechanical properties of injection molded parts are usually higher than those of compression molded parts. However, the capital costs for producing such injection molding systems using microwave energy to plasticize the material to be injected can be relatively high.

The idea of a variable volume mold cavity is known in the prior art. For example, in an injection-compression molding (ICM) process, two mold halves are maintained in a slightly open alignment as molten plastic is injected into the mold. Once the required amount of plastic to form the molded part is injected into the mold, the mold halves are advanced toward each other to close the mold and to provide improved flow of the melt into the all portions of the mold cavity to get a dense molded part without air voids. In contrast to injection-compression molding, Nomura et al. in U.S. Pat. Nos. 6,010,656 and 6,457,917 discloses a process for injecting molten resin into a variable cavity mold under pressure while the mold cavity is maintained at a first volume and then at the end of the injection cycle, expanding the volume of the mold cavity to rapidly decrease the pressure acting on the molten plastic, causing the molten plastic or resin to expand due to its internal gas pressure to obtain a relatively light product, low density product. A mat of glass fibers is preferably positioned in the mold to obtain a very light fiber-reinforced product of low density.

In both cases, the variation of the mold cavity begins either after completion of the injection or when it almost completed. In either cases, there exists a period of time when the melt is not fully compressed and it may expand, forming pores or voids in its volume. The formation of such air voids or porosity may be caused either by air trapped in the melt or due to hot gases of the melt. In ICM such air voids or porosity is removed from the melt by significant mold closing pressure and due to relatively small thickness of molded product and improved thickness to flow length relation. Neither of the described techniques are suitable for use in the injection molding of parts having relatively large cross-sections or thick walls. In thick walled parts, any air voids or pores formed in the injected plastic are likely to be trapped therein. As a result the molded part will be rejected.

There remains a need for systems for providing for the relatively rapid and uniform heating of high performance engineered plastics having relatively high operating temperatures using conventional heating sources such as electric heaters. There further remains a need for such systems for supplying molten plastic for injection molding applications in which the molded parts are of high quality and relatively free from air voids and pores. There further remains a need for such a system in which the plastic to be injected can be supplied from a plasticizing vessel designed to minimize oxidation and degradation of the plastic material therein particularly during the process of filling and emptying the plasticizing vessel. There further remains the need for operation of such system in continuous mode without interruption of the heating process while adding fresh plastic to the plasticizing vessel.

SUMMARY OF THE INVENTION

Disclosed herein is a displacement-injection molding system and process which is particularly well adapted for molding parts of relatively large cross sections and volumes. The displacement-injection molding system includes a plasticizing vessel and a variable volume mold having a movable bottom wall or plunger slidably mounted within and defining the distal end of the mold cavity. Molten plastic injected from the plasticizing vessel acts against back pressure on the mold plunger to move the plunger rearward, increasing the volume of the mold to its final, selected volume, such that molten plastic is injected into the mold cavity under pressure to prevent the formation of voids.

The plasticizing vessel described in the detailed description of the present invention includes a plurality of interior core heaters or heating elements to deliver heat into a central or interior region of the compacted pellets or powder. The core heaters are particularly well adapted for receiving conventional cartridge heaters or the like to provide the required heat. Such core heaters cannot be used in compression molding techniques because the core heaters would create holes in the molded part.

The molten plastic from the plasticizing vessel is injected into a variable volume mold having a movable bottom wall or plunger slidably mounted within and defining the distal end of the mold cavity. The mold plunger is advanced rearward or outward, against back pressure, upon injection of molten plastic into the mold cavity to expand the cavity in direct proportion to the amount of plastic injected therein. The initial volume of the variable mold cavity is approximately equal to zero which means that the mold is almost fully closed. The position of the movable plunger corresponds to the amount of the melt $M_{instant}$ injected into mold cavity. The relation between the position of the plunger $X_{instant}$ and the amount of injected material $M_{instant}$ at any moment of time is given by the formula:

$$M_{ins\,tan\,t} = \rho \cdot S \cdot x_{ins\,tan\,t} \tag{1}$$

Where:

S—is cross-sectional area of the mold cavity, inch$^2$

ρ—is the density of fully compacted material at the melt temperature; lb/inch$^3$.

For solid round parts cross-sectional area $S_{round}$ is determined by the diameter of part D and is equal to:

$$S_{round} = \frac{\pi D^2}{4}$$

For thick wall tubes cross-sectional area $S_{tube}$ is determined by outside diameter D and internal diameter d and is equal to:

$$S_{tube} = \frac{\pi}{4}(D^2 - d^2)$$

Formula (1) explains the relationship of the position of the plunger to the amount of plastic injected for the preferred embodiment of the present invention. At any moment of time during injection, the amount of injected melt $M_{instant}$ should be equal to the quantity given by the formula (1). If at the current position of the plunger $X_{instant}$, the amount of injected material is less then that given by formula (1) it will cause the expansion of the melt due to internal gas pressure in the melt and formation of voids and/or porosity in the melt. On the other hand, the amount of injected material cannot exceed that given by (1) since when the melt is fully compacted its density cannot be further increased.

It is clear that maintaining the melt in the variable mold cavity at the fully compacted state during injection will require some back pressure or counter-flow pressure applied to the movable plunger in the direction opposite to melt flow. This back pressure should withstand the internal gas pressure of the melt and should be applied to the movable plunger of the mold from the very beginning of the injection cycle up to its end when the plunger reaches the bottom of the mold. At this moment, the injection step is complete and the work piece is molded to its final dimensions. After completion of the injection step, back pressure should be maintained on the plunger until the mold cools down to the mold opening temperature. At the mold opening temperature, the molded part is completely solidified and back pressure may be released to allow opening of the mold and removing of the molded part.

The back pressure functions to eliminate air voids or porosity in the molding of thick walled parts. Back pressure is applied to the mold typically by a hydraulic cylinder, which retracts to expand the mold cavity against the pressure exerted by the molten plastic injected into the mold. The molten plastic is thereby injected into the mold cavity under pressure from two directions preventing the formation of voids or air pockets in the molded part. The disclosed method and apparatus allow efficient molding from pellets and powders of a wide variety of polymers. Virtually all polymers which are capable of flowing under pressure and heat may be molded by the disclosed displacement-injection molding apparatus and process disclosed herein.

The displacement-injection molding (DIM) system and process disclosed herein utilizes conventional heat transfer to melt or plasticize the plastic material including fiber reinforced plastics or plastics or polymers whose properties have been enhanced through the addition of various additives or the like. As used herein, the terms plastic and polymer are intended to include engineered materials in which reinforcing fibers or other additives have been added to enhance the properties of the material to be molded.

Amorphous and crystalline plastics behave differently during their heating. When amorphous plastic is heated to an injection or process temperature, it softens gradually from rigid to rubbery to a liquid state suitable for injection. For this reason amorphous plastics are characterized by a glass transition temperature, $T_g$. By contrast, when a crystalline plastic is heated, it remains solid until it reaches its melting point $T_{melt}$. At that point it changes suddenly from a crystalline solid to a molten liquid and becomes amorphous. The process temperature is usually higher than the melting point of crystalline plastics, $T_{melt}$, and higher than the glass transition temperature, $T_g$, of amorphous plastics. For simplicity, hereafter for all plastics the terms process or injection temperature shall refer to the temperature at which the plastic becomes semi-liquid with a viscosity suitable for injection. The recommended process temperature or injection temperature is typically given in the specification of each thermoplastic material provided by the supplier. As used herein, the word "melt" or "molten" refers to the semi-liquid state of the plastic at the process or injection temperature.

The displacement-injection molding ("DIM") system includes a plasticizing vessel for melting thermoplastic pellets or powder, a mold with a mold cavity for shaping injected plastic or work material, and a hydraulic unit which includes a press frame, a forward pressure or injection hydraulic cylinder, a back pressure hydraulic cylinder and one or more hydraulic pumps for feeding these cylinders. The plasticizing vessel, in which a selected quantity of granulated plastic work material is melted, consists of a side wall in the shape of hollow cylinder, a bottom wall with an attached nozzle and heating cores and a plunger for compression and ejection of the molten plastic or melt from the plasticizing vessel through the nozzle. The movable plunger contains through holes, which allow the plunger to slide along the cores during compression or ejection of the melt from the plasticizing vessel.

The injection hydraulic cylinder acts on the moveable plunger to provide forward pressure for compressing the plastic work material and for ejecting the molten work material from the plasticizing vessel into the displacement-injection mold cavity. The back pressure hydraulic cylinder acts on a movable floor or plunger in the mold to create back pressure on the injected melt which eliminates the formation of air voids and porosity in the resulting molded parts. The plasticizing vessel is adapted to permit compaction of the plastic work material prior to its heating in the vessel.

The plasticizing vessel is formed from a hollow metal cylinder surrounded by an external electrical band heater. The hollow metal cylinder surrounds or defines a plasticizing cavity which is closed off at a bottom end by a bottom end wall. A plurality of relatively small outlet openings or holes for dispersing and mixing of the melt may be formed in the bottom end member in communication with a nozzle connected to the bottom end wall. The plasticizing vessel plunger is advanceable through an inlet opening in a top end of the plasticizing vessel toward and away from the bottom end wall. At least one and preferably several core heaters are positioned within the plasticizing vessel preferably extending upward from the bottom end wall to enhance the heat transfer to the internal regions of compacted pellets and to provide enhanced uniformity of heating due to the high thermal conductivity of the metal core heaters. Although the core heaters preferable contain cartridge heaters inserted into the center of the cores, they may be heated by heat conduction alone from the hot walls of the plasticizing vessel through the bottom end wall and the plunger.

Tight tolerances should be provided between the plunger, side wall and cores to prevent flashing of the melt. All metal members of the plasticizing vessel are preferably made from hardened metal or alloys capable of withstanding high temperatures and high pressures. The nozzle may be permanently or removably attached to the bottom wall of the vessel. The plasticizing vessel preferably includes structure, such as a multi-hole dispenser in the nozzle for dispersing and static mixing of the molten work material discharged therethrough.

Prior to placement in the plasticizing vessel, the plastic pellets or granules are preferably preheated by conventional heating means, such as by conduction or forced air heating. As used herein, the term granules is intended to include other solid, granular forms of the polymer material including pellets and powders. The granules are preferably preheated to or slightly above a heat deflection temperature, defined under 264 psi of stress, at which the plastic becomes pliable but does not yet become a liquid.

In a preferred embodiment, the pellets are preferably compacted in the plasticizing vessel prior to heating therein to improve heat transfer through the pellets or granules. Preheating and compaction of the pellets provides significant improvement of the molding process for the following reasons: compaction of the pellets or powders in the plasticizing vessel allows more plastic material to be processed in the fixed volume of the vessel; and compaction of the pellets in the plasticizing vessel significantly increases the amount of surface area in contact between the pellets or fine powdered particles and reduces the amount of air trapped therebetween and, thus, significantly increases thermal conductivity of the compacted pellets, which improves heat flow through the compacted pellets resulting in a reduction of the time required for equalization of the temperature therethrough. The presence of core heaters allows for the delivery of heat directly to the central region of the compacted material and reduces the distance of heat flow. The heating time required to uniformly heat the compacted material to the desired temperature is significantly reduced.

With the plasticizing vessel positioned in the hydraulic unit, preheated plastic pellets or powder are poured by gravity into the plasticizing vessel through its inlet opening. The plasticizing vessel is also preheated prior to introduction of the plastic pellets and it retains much of its heat between ejection and filling cycles. The ejection actuator is utilized to compact the work material in the plasticizing unit. The movable plunger is removably coupled to the end of the ejection actuator piston which advances the plunger through the inlet opening of the plasticizing vessel, along the core heaters and toward the bottom end wall, compacting the pellets therebetween. To increase the shot capacity, the plunger may then be removed and an additional amount of preheated pellets may then be added into the heating vessel and compacted with the previously compacted pellets.

During the heating cycle the plunger may be heated by a built-in electrical cartridge heater or by a removable electrical disk heater with holes for the core heaters. In the latter case, the disk heater should be removable positioned between the plunger and the piston of hydraulic actuator and thermally insulated from the piston by a rigid insulator, such as a thick mica disk. The ejection actuator piston remains in an extended position under the pressure during the heating cycle to maintain the pellets in a compacted state during the heating cycle. The top plunger may not contain an electric heater and it may be heated by heat conduction from hot the sidewall of the vessel.

When compaction of the pellets is completed, the electrical heaters of the plasticizing vessel and mold members are actuated to raise the temperature of the pellets uniformly to the desired injection temperature. The temperature rise of each mold member may be controlled by electronic temperature controllers such as programmable logic controllers (PLC's). The granules or powder are heated by thermal conduction from the heated plasticizing vessel members including the core heaters.

Once the plastic granules are heated to the injection temperature for the selected plastic, the back pressure hydraulic cylinder is actuated to extend its piston and drive the movable plunger of the displacement-injection mold toward the injection port closing the mold. A valve between the plasticizing vessel and the mold cavity is opened and the molten plastic is ejected out of the plasticizing vessel through the nozzle and then through a sprue into the mold cavity of the mold which has been preheated to a temperature closely approximating the injection temperature.

In ejecting plastic from the plasticizing vessel into the mold, the forward pressure must be higher then the back pressure created by the back pressure cylinder to allow the melt to flow into the mold cavity. The injection rate for displacement injection molding is relatively slow in comparison with that of conventional injection systems due to the back pressure imparted by the back pressure hydraulic actuator. The difference in pressure between the ejection actuator and the back pressure actuator must be sufficient to overcome the melt's resistance to the flow due to its viscosity. The difference in pressure between the ejection actuator and back pressure actuator displaces the melt from plasticizing vessel to the mold.

When the displacement-injection mold is in the fully closed position the mold cavity is minimized and generally devoid of any air that might otherwise form bubbles or voids in the molded product. Under the pressure exerted by the ejection actuator, the molten plastic or melt, pushes against the bottom or displaceable wall in the mold cavity causing the back pressure cylinder to retract. When the bottom wall reaches the bottom of the mold, the mold cavity reaches its maximum volume. The valve between the plasticizing vessel and the mold cavity is closed and the forward hydraulic actuator piston and attached plunger are retracted out of the plasticizing vessel to open the inlet opening to the plasticizing vessel to permit filling of the plasticizing vessel with another load of preheated plastic granules for the next shot. The molten plastic in the mold is then cooled to mold opening temperature until the molded part solidifies. It is preferable to maintain the back pressure on the melt during cooling cycle to prevent the delaminating and/or formation of the cracks in the molded part while it shrinks. After completion of cooling cycle, the back pressure may be released, the mold may be opened and the molded part removed.

Generally, the cooling time exceeds the heating time of the work material in the plasticizing vessel. For this reason, it is practical to have one or more separate cooling stations, where the mold with the molded part may be transported for cooling down the part to mold opening temperature. During cooling the mold in the cooling station, the injection station may be prepared for next shot with another mold. Such cooling station should contain hydraulic cylinder for maintaining molded part under the pressure while it is cooling. The desired cooling rate may be provided by programmable logical controller (PLC).

The developed technique may be referred to as displacement-injection molding which eliminates the formation of air voids or porosity in thick wall molded parts.

In an alternative embodiment of the present invention, the plasticizing vessel incorporates at least two and preferably three or more different or distinct heating zones for heating the plastic feed material to increasingly higher temperatures. In the preferred embodiment of the present invention the vessel may be subdivided into three zones with a top or first portion for adding fresh pellets and for initial compaction of the pellets, a middle portion for preheating pellets to intermediate temperatures, and a bottom or end portion adjacent to the nozzle for uniform heating of plastic material in this portion to the injection temperature. The alternative embodiment of the plasticizing vessel may be referred to as a continuous heating vessel or a multi-zone plasticizing vessel.

The amount of material in each portion or zone of the plasticizing vessel preferably is equal to or approximates the shot size. The density of compacted pellets in the bottom portion is maximal and equal to or closely approximates the density of fully compacted polymer material at a given injection temperature. Correspondingly, by the end of heating cycle the temperature of the bottom portion of the vessel is uniformly distributed through its volume and equal to its injection temperature $T_{inj}$. Moving toward the top portion of the plasticizing vessel, the temperature of compacted pellets gradually reduces and in the very top region, adjacent to the plasticizing vessel's plunger, the temperature of the compacted pellets is approximately equal to or below the heat deflection temperature $T_{defl}$ defined at 264 psi, of the polymer material. At this portion of the vessel polymer pellets are compacted only partially. For this reason the bottom zone has the smallest volume compared to middle and top zones. The volumes of these zones are related approximately in the proportion 0.25:0.33:0.42 while the amount of polymer material in each zone remains the same and equal to shot size. Accordingly, the three-zone vessel contains three shot size of polymer material.

A multi-zone plasticizing vessel of the present invention has several advantages over conventional screw or plunger type plasticizing vessels. The ratio of the length L over diameter D of conventional screw type barrels (L/D) is of the order of 20:1. For the plasticizing vessels disclosed for use with the displacement injection mold (DIM), the L/D is significantly smaller due to higher plastic content in the vessel. The relative plastic content in the DIM vessel is over 80% of the barrel's internal volume, while for conventional vessels it is usually under 50%. This is because the screw (or torpedo for plunger type vessels) occupies a significant portion of barrel's volume. As a result, the same shot capacity may be provided using a DIM vessel of significantly smaller dimensions.

The process cycle may be described as follows. After injection of the melt contained in the bottom portion of the plasticizing vessel into the mold by the previously described displacement injection molding method, the top plunger is removed from the vessel. The top portion of the vessel is now empty and the top layer of previously compacted pellets may be exposed to atmospheric air without harm since the temperature of this layer is near the heat deflection temperature $T_{defl}$ and any appreciable oxidation does not occur until significantly higher temperatures are reached. Plastic pellets previously located in the top zone of the vessel before the shot have been shifted into middle zone for preheating, while compacted and preheated material from the middle zone has been displaced into the bottom zone for final heating to the injection temperature $T_{inj}$. A shot size amount of fresh pellets is then loaded into the top zone of the plasticizing vessel. The added pellets are preferably preheated to approximately heat deflection temperature $T_{defl}$ before introduction into the plasticizing vessel by conventional heating means such as convection heating or the like.

Fresh, pre-heated pellets are poured into the plasticizing vessel by gravity or by other means, for example, vacuum means. The freshly added pellets are then compacted by forward movement of the top plunger into the vessel and applying hydraulic pressure to the plunger. Several sequential steps of adding and compacting of pellets are generally required to add the necessary amount of plastic pellets or granules into the vessel for the next shot. The process of adding and compacting adding pellets does not interrupt the heating process since the plasticizing vessel's heaters are "ON" at all the time.

Precaution should be taken to prevent the trapping of air in the volume of compacted pellets. It is practical to employ a vacuum to remove any air from the plasticizing vessel cavity prior to and during the compaction phase.

The temperatures of all external and internal electrical heaters for the plasticizing vessel are controlled by a programmable logic controller (PLC) or other electronic means, for example, DME multi-zone temperature controllers. Each core within the vessel contains an electrical cartridge heater which may have multiple heating elements with different power ratings to control the core temperature in different zones of the vessel. The cores also contain built-in cartridge type thermocouples to control the temperature of the cores. In another embodiment of the present invention, the cartridge heaters of each core contain single heating elements with the length approximately equal to the length of the bottom zone. In this arrangement, the portion of the core in the bottom zone is controllably heated and maintained at the injection temperature $T_{inj}$. Heat is then delivered to the middle and top portions of the cores by thermal conduction due to the high thermal conductivity of the metal cores. The temperature of the cores gradually drops from $T_{inj}$ in the bottom zone toward the top and is lower then $T_{defl}$ near the top plunger.

Similar to the previously disclosed design of the single batch type plasticizing vessel, the side wall of the alternative embodiment of the plasticizing vessel is heated by band electrical heaters located on the outside circumferential surface of the vessel. The number of band heaters and their temperature settings are chosen to provide desirable temperature distribution along the vessel as was described hereabove.

In the multi-zone plasticizing vessel, the top plunger does not require a heating element since it is desired to maintain the temperature of the compacted pellets relatively low. Instead the top plunger is heated by the compacted pellets, the side wall and the cores. The heat accumulated by top plunger is radiated to atmosphere and conducted to the hydraulic piston extension. The resulted equilibrium temperature of the pellets and the plunger in the very top portion of the vessel is generally near or below the heat deflection temperature $T_{defl}$.

Immediately after injection, the temperatures in the middle and bottom zones slightly drops due to the introduction of plastic material from the previous zone having temperatures lower than the temperature previously established in these zones. After a short period of heating time the temperature of the plastic material that has been advanced into the bottom zone is raised to the injection temperature, $T_{inj}$, and the contents of the bottom zone are ready for the injection. At the same time, the compacted pellets in the top and middle zones are heated to higher temperatures and this heating process is repeated after each shot. The heating time between the shots for the multi-zone plasticizing vessel is significantly reduced compared to the batch vessel since plastic pellets are continuously preheating in three stages while they are moving from the top zone to the middle zone, and finally to the bottom zone for injection.

For example, in my previously filed patent application Ser. No. 11/391,999 there was disclosed a batch plasticizing vessel for molding round parts 4 inches in diameter and 6.5 inches long from carbon fiber filled PEEK (polyetheretherketone). This batch plasticizing vessel requires 30 minutes of heating time to raise the temperature of the compacted pellets therein from 540° F. to 740° F. and an additional 30 minutes to cool down the vessel and 5 minutes for adding fresh pellets resulting in a total cycle time 65 minutes. The multi-zone plasticizing vessel allows operation in a continuous mode and reduces the heating time to 15 minutes and a full cycle time of 20 minutes.

Another advantage of the multi-zone plasticizing vessel is that it doesn't require tight tolerances in machining vessel parts and it doesn't require high grades of tool steel. Since the plastic pellets in the top zone have intimate contact with the top plunger and are at a temperature that is near or below the heat deflection temperature $T_{defl}$, the plastic material does not flash when pressure is applied to top plunger during the injection step. This allows the utilization of lower grade metals or alloys with reduced quality of surface finish and significantly reduced tolerances for machining. For example, the gap between plunger and inner vessel surface in the multi-zone plasticizing vessel may reach approximately 0.020 inches or more compared to 0.00025 inches for a single batch vessel. No flashes of polymer material will be produced at or near the heat deflection temperature $T_{defl}$ through such a gap. This significantly reduces the material and machining cost of the vessel and increases its life time.

As mentioned above, it is preferable to provide a three-zone vessel with three stages of heating: warming up in the top vessel zone, preheating to intermediate temperatures in the middle zone, and heating to injection temperature in the bottom zone. The same vessel may be rearranged as a two-zone vessel with two stages of preheating by changing the temperature setting of the external and internal heaters. A two-zone vessel will increase the shot capacity to ½ of the polymer charge in the vessel, while a three-zone vessel has only ⅓ shot capacity of the polymer charge. The disadvantage of a two-zone vessel is the increased possibility of polymer oxidation when the top plunger is removed from the vessel for adding fresh pellets. With a two-zone arrangement, the top plunger is pressed deeper into the vessel where the side-wall's and core's temperatures may be well above $T_{defl}$ and may cause the oxidation of polymer material. Even though the pellet's surface temperature adjacent to top plunger is below heat deflection temperature $T_{defl}$, some portion of pellets having intimate contact with hot cores and side walls may be overheated and oxidized.

On the other hand, the same vessel may be used for molding smaller parts with a reduced shot size. In this case, to prevent aging of the melt due to prolonged residence time in the bottom zone, the length of the bottom zone should be reduced. By reducing the shot size, the number of shot charges contained in the vessel's volume increases proportionally and the number of temperature zones should be increased accordingly. In spite the increased residence time of pellets in such a vessel, the proper setting of the temperatures in different zones will eliminate aging of polymer material due to prolonged heating at high temperatures.

BRIEF DESCRIPTION OF THE DRAWINGS

FIGS. 10a-c are diagrammatic views showing displacement of molten plastic from the plasticizing vessel to the displacement-injection mold and showing the forward and backward directed pressures acting on the molten plastic.

FIG. 13 is an exploded and fragmentary perspective view of an alternative embodiment of the displacement injection mold for molding hollow tubes and utilizing a core for forming the bore in the tube.

FIG. 14 is a perspective view of a hollow tube formed by the mold shown in FIG. 13.

FIG. 15 is a perspective view of a collapsible core for use in association with the mold shown in FIG. 13.

DETAILED DESCRIPTION OF THE INVENTION

Figure 1:
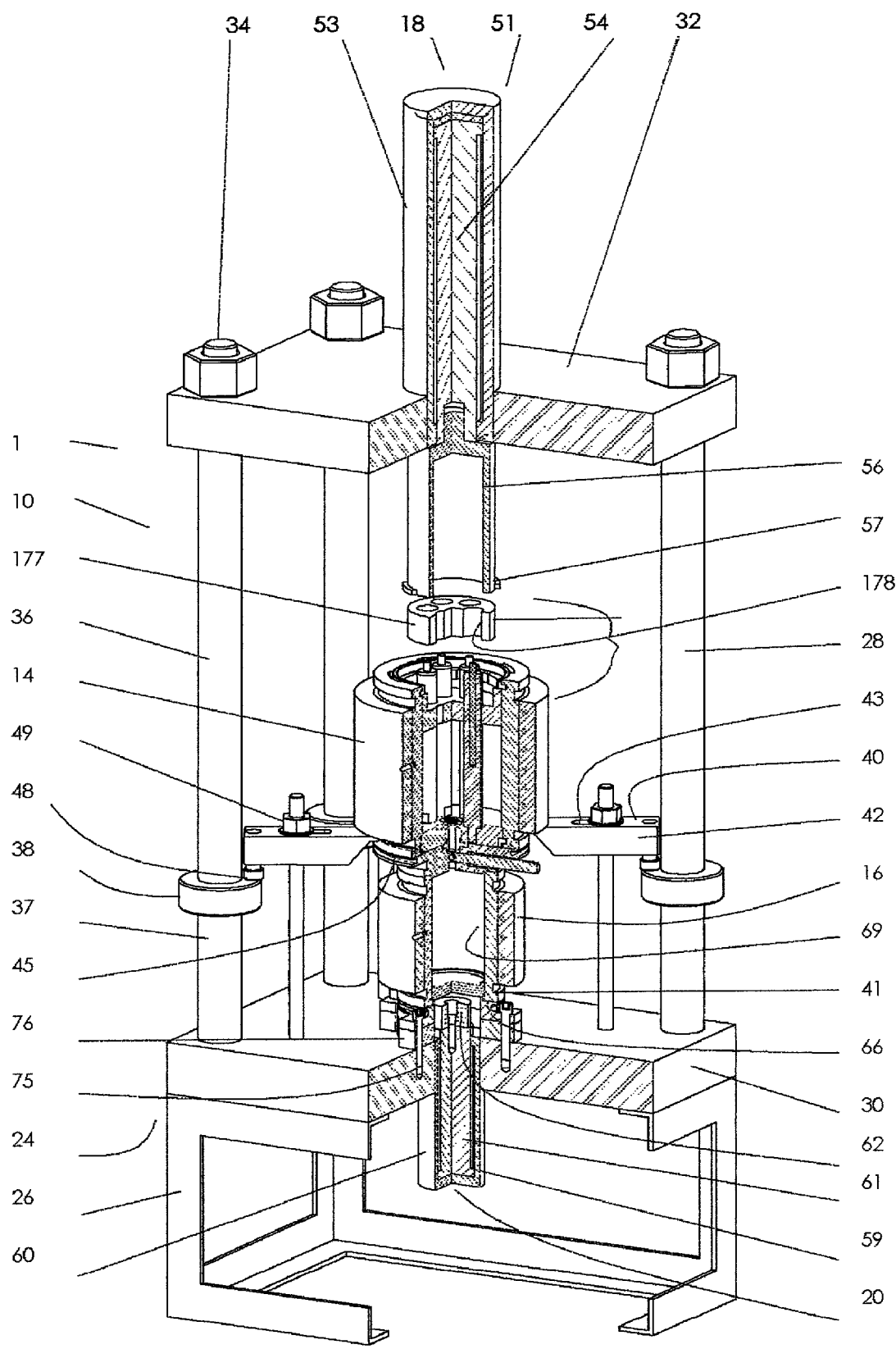
FIG. 1 is a partially exploded perspective view of a molding station of a displacement-injection molding system of the present invention with portions removed to show detail therein.
Figure 2:
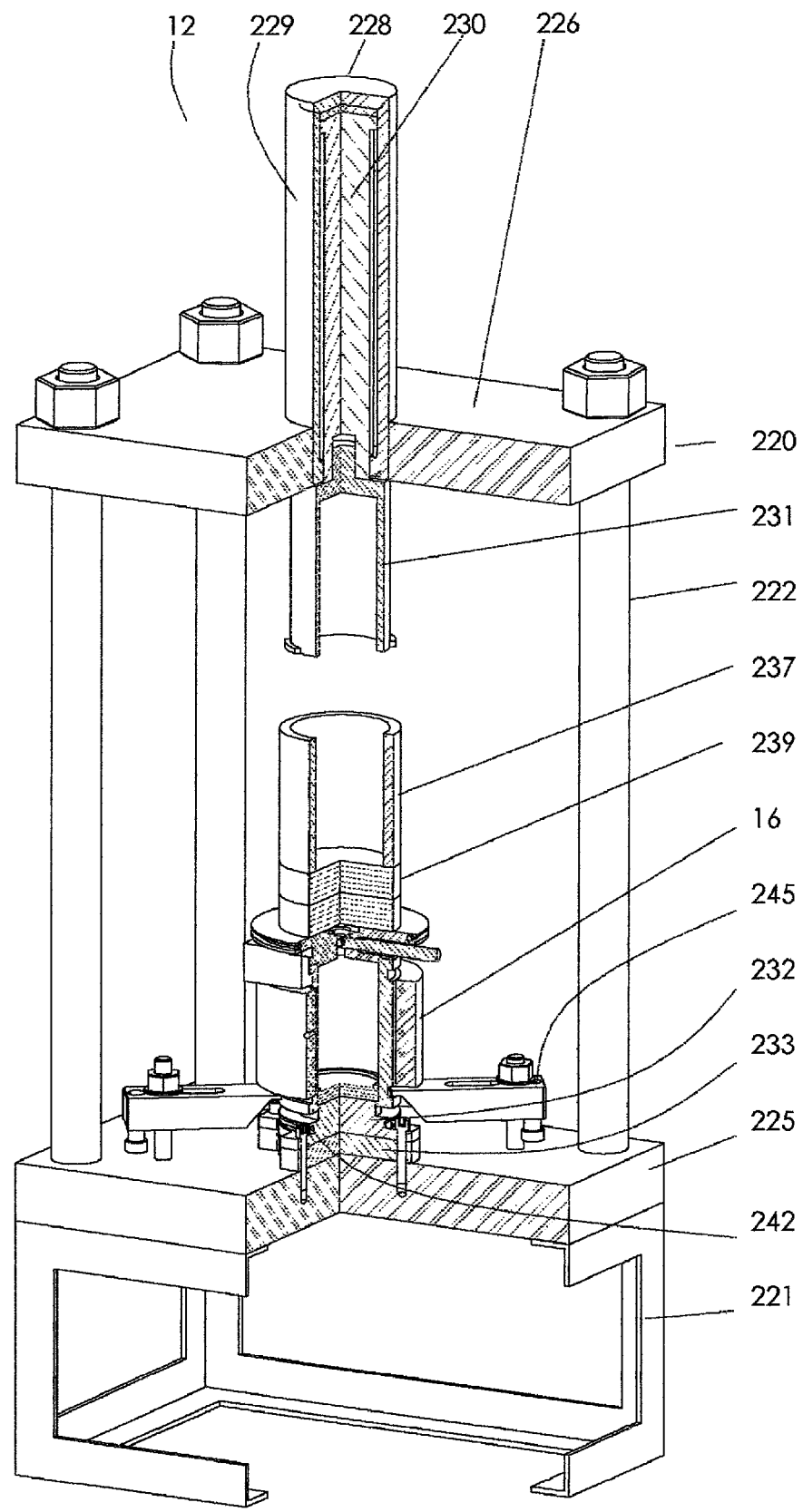
FIG. 2 is a perspective view of a cooling station of the displacement-injection molding system of the present invention with portions removed to show detail therein.

Referring to the drawings in more detail, a preferred embodiment of a displacement-injection molding system 1 is shown in FIGS. 1 and 2. The molding system consists of a molding station 10 (FIG. 1) and cooling station 12 (FIG. 2). The molding station 10 comprises a plasticizing vessel 14 in which plastic granules are received and heated to their melting point, a displacement-injection mold 16 where the molded part is shaped and solidified, an ejection or injection assembly 18 for ejecting molten plastic out of the plasticizing vessel 14 and into the mold 16 and a back pressure assembly 20 for creating pressure to resist the flow of molten plastic into the mold 16. The foregoing components of the injection station 10 are all mounted or adapted to be supported on a frame 24 which is shown resting on a pedestal or base 26.

Frame 24 comprises a set of tie bars or tie bar assemblies 28 which are fixedly connected to and extend upward from a base plate 30 to an upper plate 32. Each tie bar assembly 28 includes a threaded tie bar 34 extending through upper and lower hollow spacers or tubes 36 and 37 and an annular support member or ring 38. The support ring 38 is positioned above and supported on the lower spacer 37 and the length of the lower spacer 37 is selected space the support ring 38 at a desired height as discussed in more detail hereafter. The upper and lower spacers 36 and 37 in combination with the support ring 38 function to set the desired spacing between the base plate 30 and upper plate 32. The frame 24 is designed to withstand the pressures generated by the injection assembly 18 and back pressure assembly 20 acting on the plasticizing vessel 14 and the displacement-injection mold 16 respectively.

At least two clamps or clamping assemblies 40 may be employed for clamping or securing the plasticizing vessel 14 against the displacement-injection mold 16 and the displacement-injection mold 16 against the base plate 30. Each clamping assembly 40 includes a threaded extension bar 41 threadingly connected to and extending upward from the base plate 30 and a slotted clamp member 42. The extension bar 41 extends through a slot 43 in the clamp member 42 which allows vertical and horizontal adjustment of the position of the clamp member 42 relative to the extension bar 41. An inwardly projecting lip 45 on one end of the clamping member 42 is adapted for selective engaging the plasticizing vessel 14 to hold the plasticizing vessel 14 and the displacement-injection mold 16 in place as generally shown in FIG. 1 and as discussed in more detail hereafter.

An outer end of each clamping member 42 is supported on an associated supporting ring 38 of the frame assembly 24 by an adjustable bolt or height adjustment mechanism 48 threadingly secured to a rear end of each clamping member 42. The adjustable bolt 48 is threadingly connected to the clamping member 42 to permit raising and lowering of the outer end of the clamping member 42 to correspond to the height of the lip 45. A nut 49 on the end of each extension bar 41 can be tightened downward on the threaded end of the extension bar 41 to draw the clamping member 42 down tight against the plasticizing vessel 14 and the supporting ring 18.

Referring to FIG. 1, the injection assembly 18 comprises a first linear actuator 51 including a cylinder 53 which is secured to upper plate 32 and a piston 54 reciprocally mounted within the cylinder 53 and extending through an opening in the upper plate 32. The injection assembly 18 may also be referred to as a forward pressure assembly for providing pressure in a first or forward direction. A piston head 56 is threadingly connected to the outer end of the piston 54. The piston head 56 includes a plurality of lugs 57 for use in coupling with a moveable end wall or plunger of the plasticizing vessel 14 as discussed hereafter. The back pressure assembly 20 comprises a second linear or hydraulic actuator 59 including a cylinder 60 which is secured to the base plate 30 and a piston 61 reciprocally mounted within the cylinder 60. An insulating member or pad 62 is connected to and forms a distal end of the piston 61 for insulating the hydraulic actuator 59. Although, forward and back pressures may be created by air cylinders or other means, it is practical to use hydraulic cylinders when the required capacity of such actuators exceeds 25 tons.

Figure 3:
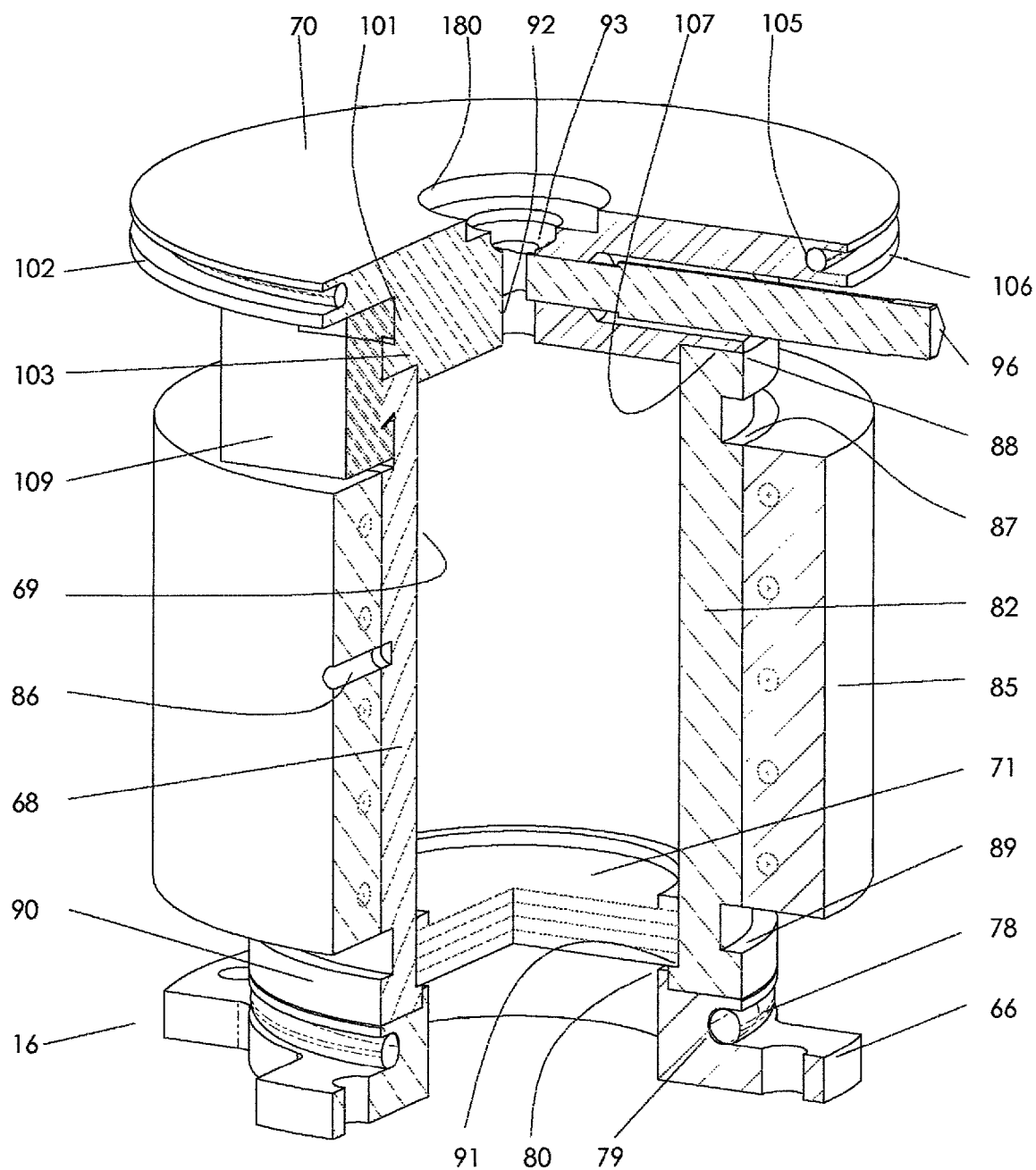
FIG. 3 is an enlarged and fragmentary view of a displacement-injection mold of the present invention.

The mold 16, is best shown in FIG. 3 in which portions have been removed to show interior detail thereof. For illustrative purposes, the mold 16 is shaped for molding cylindrical parts exceeding several inches in diameter. It is to be understood that the mold may be designed or shaped to mold parts of various shapes and dimensions.

The mold includes a base mounting flange 66, a mold sidewall 68 defining a variable volume mold cavity 69, an inlet end wall or upper flange member 70 and a moveable mold member, wall or plunger 71 slidably mounted within the mold cavity 69 to vary the volume of the mold cavity 69. As shown in FIG. 1, the base mounting flange 66, which is preferably formed from metal, is connected to the base plate 30 by bolts 75 with a layer of insulation 76 interposed therebetween to thermally separate the mold 16 from base plate 30. Insulation of the mold 16 from the base plate 30 permits increased efficiency in preheating and cooling of the mold 16 during molding cycles. Silicon bonded mica plates or glassmica plates may be used as a material for insulating layer 76. Silicon bonded mica can withstand temperatures up to 1292° F., compression pressure of up to 17,000 psi and has very low thermal conductivity.

The base mounting flange 66 and the insulating layer 76 are annular, having central openings extending therethrough in alignment with a hole in the base plate 30 through which the back pressure assembly piston 61 extends for engagement with the moveable mold member or wall 71. Referring again to FIG. 3, a bendable, tubular cartridge heater 78 is positioned or mounted in a circumferential groove 79 formed in the outer periphery of the base mounting flange 66 for preheating the flange 66 as well as portions of the mold sidewall 68 by conduction during the heating cycle. The heater 78 may also be used to control the uniformity and rate of cooling of the mold components during a cooling cycle. The base mounting flange 66 may include an upwardly projecting lip 80 extending around the central opening in the mounting flange 66 for use in centering the mold sidewall 68 thereon as discussed hereafter.

In the embodiment shown in FIG. 3, the mold sidewall 68 is generally formed as a hollow metal cylinder or sleeve 82, with an internal bore or chamber, and is surrounded by a band heater 85 such as can be purchased from Plastic Process Equipment Incorporated which generally comprises a heating coil surrounded by a layer of ceramic material with an outer insulating layer all housed in a metal enclosure. A thermocouple (not shown) may be connected to the mold sidewall 68 through a hole 86 in the band heater 85 to control the temperature by electronic means (not shown). The lower end of the mold sidewall 68 is supported or mounted on an upper surface of the base mounting flange 66 and over the mounting flange lip 80 for centering the sidewall in alignment with the hydraulic actuators 51 and 59.

A first circumferential groove 87 is formed in the outer surface of the sleeve 82 near its upper or inlet end to form a first outwardly projecting flange or upper flange 88 extending thereabove. A second circumferential groove 89 is formed in the outer surface of the sleeve 82 near its lower or distal end to form a second outwardly projecting flange or lower flange 90 extending thereabove. An inwardly projecting lip or shoulder 91 is formed on or removably mounted on an inner surface of the sleeve near its lower or distal end to create a stop to prevent the moveable mold member 71 from sliding past the shoulder 91.

The inlet end wall 70 shown is formed from metal and includes a sprue 92 extending therethrough which opens into a hemi-spherical depression 93 formed in the outer surface of the inlet end wall 70 for receiving a nozzle 94 of the plasticizing vessel 14. The sprue 92 comprises a passageway in communication with the mold cavity 69 through which molten plastic from the plasticizing vessel 14 may be injected into the mold cavity 69. A valve 96 is mounted within the inlet end wall 70 of the mold 16 and selectively operable for closing the sprue 92 to control the flow of molten plastic into the mold cavity.

A first circumferential groove 101 is formed in an outer surface of the inlet end wall 70 and generally separates an upper radial flange 102 from a lower radial flange 103. In the embodiment shown, the upper radial flange 102 is larger in diameter than the lower radial flange 103. A bendable cylindrical cartridge heater 105 is positioned within a circumferential groove 106 formed in an outer surface of the upper radial flange 102 of the inlet end wall 70 for heating or otherwise controlling the temperature of the inlet end wall 70 during heating and cooling stages.

The inlet end wall 70 is supported on and generally closes off the upper end of the metal sleeve 82 of the mold sidewall 68. An annular recess 107 may be formed in a bottom surface of the inlet end wall 70 to receive the upper end of the sleeve 82 and ensure proper alignment of the inlet end wall 70 with the sleeve 82. Clamping blocks or dove tail clamps 109 (one of which is shown in FIG. 3) may be slid into engagement with the upper flange 88 on the sleeve 82 and the lower flange 103 on the inlet end wall 70 to secure the inlet end wall 70 to the sleeve 82. The flanges 88 and 103 may include undercuts to form a dovetail shape to ensure the inlet end wall 70 remains connected to the sleeve 82 during the molding process and during transportation of the mold 16 to the cooling station 12.

The moveable mold member 71, which may also be referred to as a mold plunger, is driven by the piston 61 of back pressure hydraulic actuator 59. The piston 61 is thermally insulated from moveable mold member 71 by the insulating pad or layer 62 mounted on the end of the piston 61 to protect the actuator 59 from overheating. A silicon bonded mica disk of 1-2 inches thickness may be used for such thermal insulation. During the heating cycle the piston 61 of the back pressure actuator 59 is fully retracted allowing engagement or abutment of the moveable mold member 71 with the inwardly projecting lip or shoulder 91 secured on the inner surface of the mold sidewall 68 near its lower edge to prevent the moveable mold member 71 from sliding past the shoulder 91 and the bottom edge of the mold sidewall 68. With the moveable mold member 71 positioned against the shoulder 91, the mold 16 may be described as being in its fully opened state, maximizing the volume of the mold cavity 69.

When the back pressure actuator 59 is fully extended, the moveable mold member preferably extends in closely spaced relation to the inlet end wall 70 to minimize the volume of the mold cavity. It is preferable to leave a slight gap between the moveable mold member 71 and the inner surface of the inlet end wall 70 to provide sufficient surface area across the moveable mold member 71 upon which the molten plastic may act to overcome the back pressure exerted by the back pressure actuator 59. The gap may be formed by restricting upward movement of the hydraulic piston 61. It may also be formed by a variety of means including an inwardly projecting lip on the inner surface of the inlet end wall 70 or an upwardly projecting circumferential lip on the moveable mold member 71.

Figure 4:
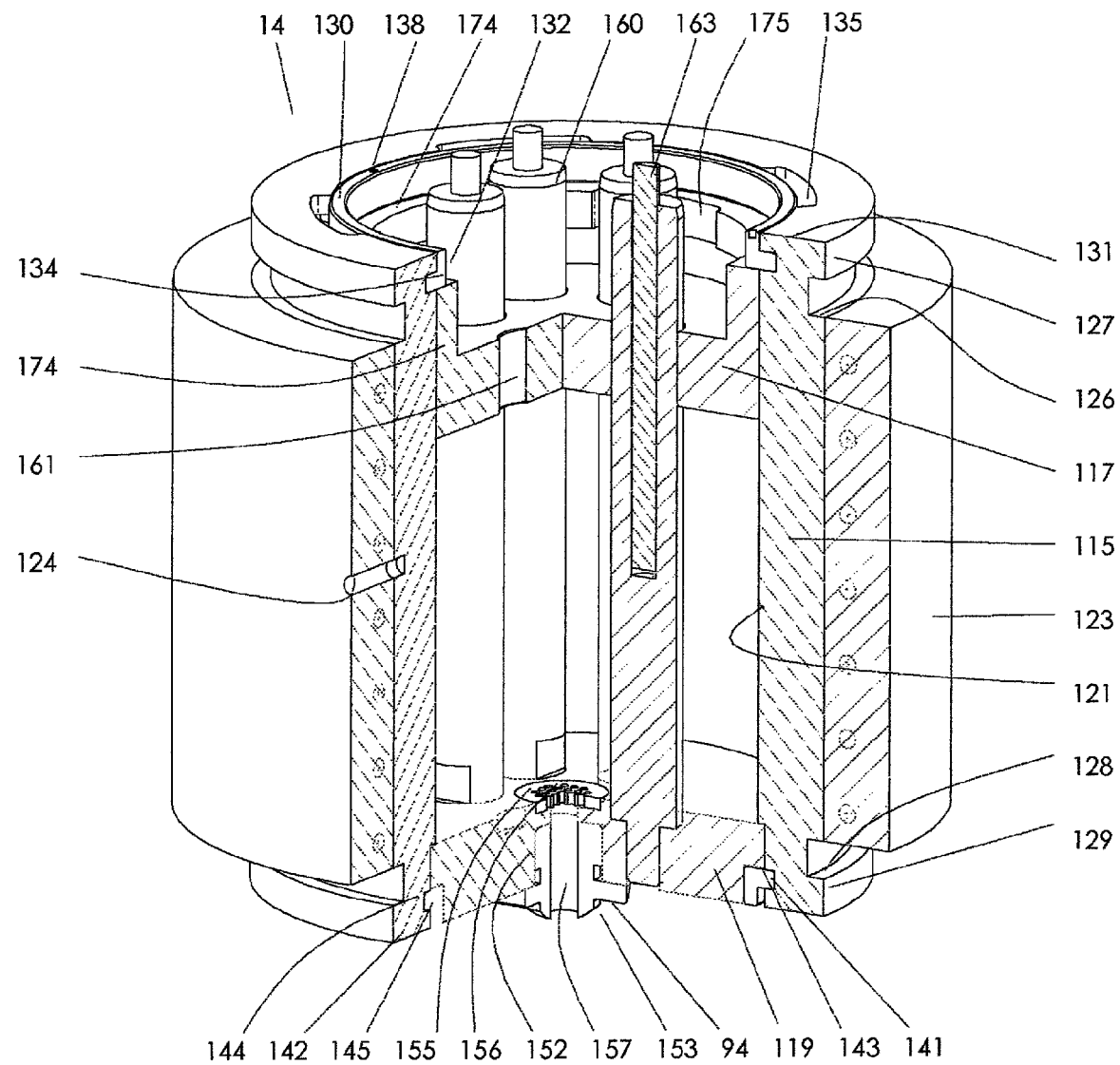
FIG. 4 is an enlarged and fragmentary view of a plasticizing vessel of the present invention.

Plasticizing Vessel: The plasticizing vessel 14, as best seen in FIG. 4, is adapted to receive pellets of a plastic or polymer work material and uniformly heat the pellets to an injection temperature. The injection temperature is the temperature at which the polymer work material has a viscosity suitable for injection (or displacement) into the mold or in other words a temperature at which the plastic may be injected into the displacement-injection mold 16. In the embodiment shown in FIG. 1, the plasticizing vessel 14 is supported on top of and in flow communication with the displacement-injection mold 16 and is acted upon by the ejection or injection assembly to force the molten contents of the plasticizing vessel 14 into the displacement-injection mold 16.

Referring again to FIG. 4, the plasticizing vessel 14 comprises a cylindrical wall or metal sleeve 115, moveable end wall or plunger 117 and a stationary end wall 119 defining a plasticizing vessel cavity 121 in which the plastic granules are received, compacted and heated to their injection temperature. The sleeve 115 preferably is made of a hardened metal or alloy to withstand high pressures and temperatures. High-speed tool steel may be employed as the material for the plasticizing vessel and the displacement-injection mold members. The sleeve 115 is surrounded on its outer surface by an electrical band heater 123 generally of the same type used for the mold 16 such as ceramic band heaters sold by Plastic Process Equipment, Inc. These band heaters have built-in ceramic thermal insulation which significantly reduces heat radiation. The band heater 123 also contains a small hole 124 for the attachment of the thermocouple to the sleeve 115 to control its temperature during heating cycles. The metal sleeve 115 and the band heater 123 may be collectively referred to as the plasticizing vessel sidewall or circumferential sidewall 125.

A first or upper circumferential clamping channel 126 is formed in an outer surface of the metal sleeve 115 near an upper end thereof. The channel 126 forming an upper flange 127. A second or lower circumferential clamping channel 128 is formed in an outer surface of the metal sleeve 115 near a lower end thereof. The channel 128 forming a lower flange 129. The lower channel 128 is adapted to receive the clamping member 42 for securing the plasticizing vessel 14 in place on the mold frame 24. The upper channel 126 is used for engagement of a pulling device (not shown) to raise or remove the plasticizing vessel 14.

With reference to the plasticizing vessel 14 as oriented in FIG. 4, the stationary end wall 119 is positioned below the plunger or moveable end wall 117. The end walls 117 and 119 are preferably formed of hardened metal or alloy and provide tight tolerances to prevent molten plastic from leaking between the end walls 117 and 119 and the sleeve 115, but do permit the plunger 117 to slide relative to the sleeve 115.

A top lock ring 130 is removably securable to the metal sleeve 115, near a top or upper end 131 thereof to form an inwardly directed shoulder or lip 132 which prevents the plunger 117 from sliding past or out of the upper end 131 of the sleeve 115. The top lock ring 130 may incorporate lugs 134 for making a bayonet type connection to the sleeve 115 to facilitate quick and easy securement and removal of the lock ring 130 with the sleeve 115. However, the lock ring 130 may be removably secured to the metal sleeve 1 by other means, such as for example, by mating threads on the outer surface of lock ring 130 and the inner surface of the upper end 131 of metal sleeve 115. In FIG. 4 the lock ring incorporates four lugs which cooperate with four slots 135 formed in the sleeve 115 to make the bayonet connection.

The lock ring 130 is connected to the sleeve 115, by insertion of the lugs 134 in the slots 135 and then rotating the lock ring 115 45° in either direction. One or more tool receiving holes 138 are preferably formed on an upper or outer surface of the upper lock ring 130 to receive a tool for use in separating the top lock ring 130 from the metal sleeve 115. When the plasticizing vessel 14 is in use, the top plunger 117 generally abuts and engages the top lock ring 130 proximate the upper end 131 of the sleeve 115. For refilling pellets prior to the next shot, the top plunger 117 may be removed from the sleeve 115 through the upper end 131 by first removing the lock ring 130. It is foreseen that the plasticizing vessel 14 could be utilized without the top lock ring 130.

A second or bottom lock ring 141 is removably securable to the metal sleeve 115 near a lower or bottom end 142 thereof to form an inwardly directed shoulder or lip 143. The bottom lock ring 141, may be identical in construction to top lock ring 130 including lugs 144 which cooperate with bayonet slots 145 formed in the sleeve 115 to permit a bayonet type connection of the bottom lock ring 141 to the sleeve 115. When secured to the lower end 142 of the metal sleeve 115, the bottom lock ring 141 prevents the stationary or lower end wall 119 from sliding out of the sleeve 115 past the lower end 142. One or more tool receiving openings or holes 146 are formed in the outer end or surface of the bottom lock ring 141 to receive a tool for use in separating the bottom lock ring 141 from the metal sleeve 115. The bottom end wall 119 may be removed from the sleeve 115 through the lower end 142 for maintenance and the like by first removing the bottom locking ring 141.

The nozzle 94, preferably made of a hardened metal or alloy, is mounted in a threaded, nozzle receiving hole 152 in the bottom end wall 119. The nozzle 94 is screwed into the bottom end wall 119 and has a semi-spherical curved distal end 153. The nozzle 94 may include an inlet plate 155 having a plurality of mixing holes 156 formed therein, in communication with a main interior passageway 157 through the nozzle 94. The mixing holes 156 provide static mixing and dispersing of the molten plastic as it is forced out of the plasticizing vessel 14 and through the passageway 157 of nozzle 94 and to the mold 16.

A plurality of heat transfer members, heating elements or cores 160, five in the embodiment shown in FIG. 4, are threadingly connected to the bottom end wall 119 and extend upward therefrom through holes 161 in the plunger moveable end wall or plunger 117 and generally to the top of the plasticizing vessel 14. The cores 160 generally extend in parallel alignment with an axis of the plasticizing vessel cavity 121. The core receiving holes 161 formed in the plunger 119 are sized to form a relatively snug fit around the cores 160 to prevent molten plastic from flowing therethrough but are large enough to permit the plunger 119 to slide across or over the cores 160. The cores 160 function to deliver heat directly to the central region of the plasticizing vessel cavity 121 to reduce the distance of heat flow during the heating cycle. The cores 160 are preferably formed from metal and heated by electric cartridge heaters 163 inserted in bores 164 formed in the upper end of the cores 160. The cartridge heaters 163 preferably contain built-in thermocouples for electronic control of their temperatures. It is foreseen that the cores or heat transfer members 160 could function to transfer heat without the connection of heating elements or cartridge heaters 163 directly thereto, but instead simply serve as a conduit for transferring heat generated by heaters mounted on interconnected portions of the plasticizing vessel.

Figure 5:
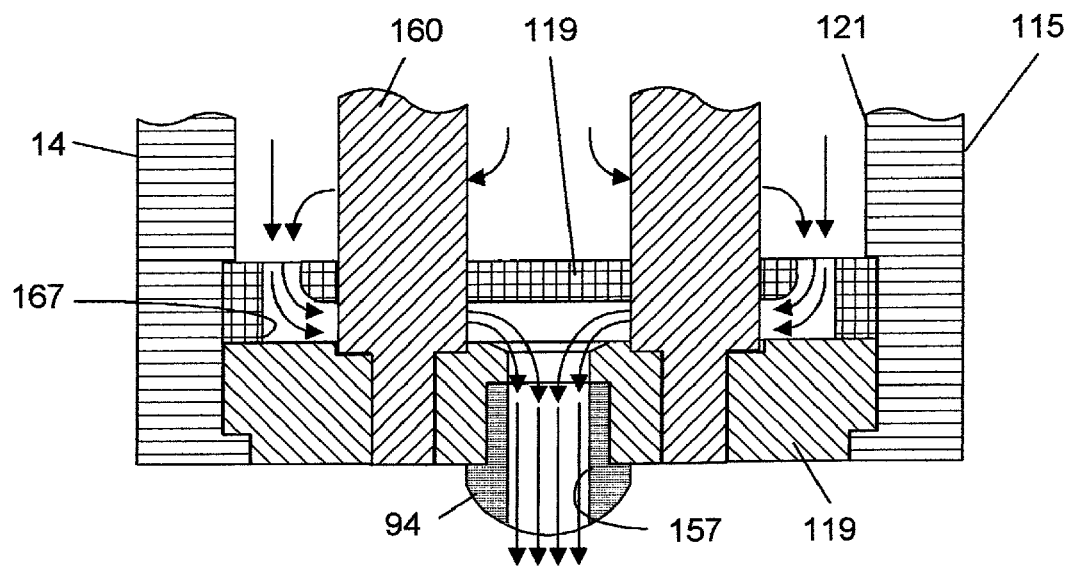
FIG. 5 is a fragmentary and diagrammatic cross-sectional view of an alternative embodiment of the plasticizing vessel of the present invention.
Figure 6:
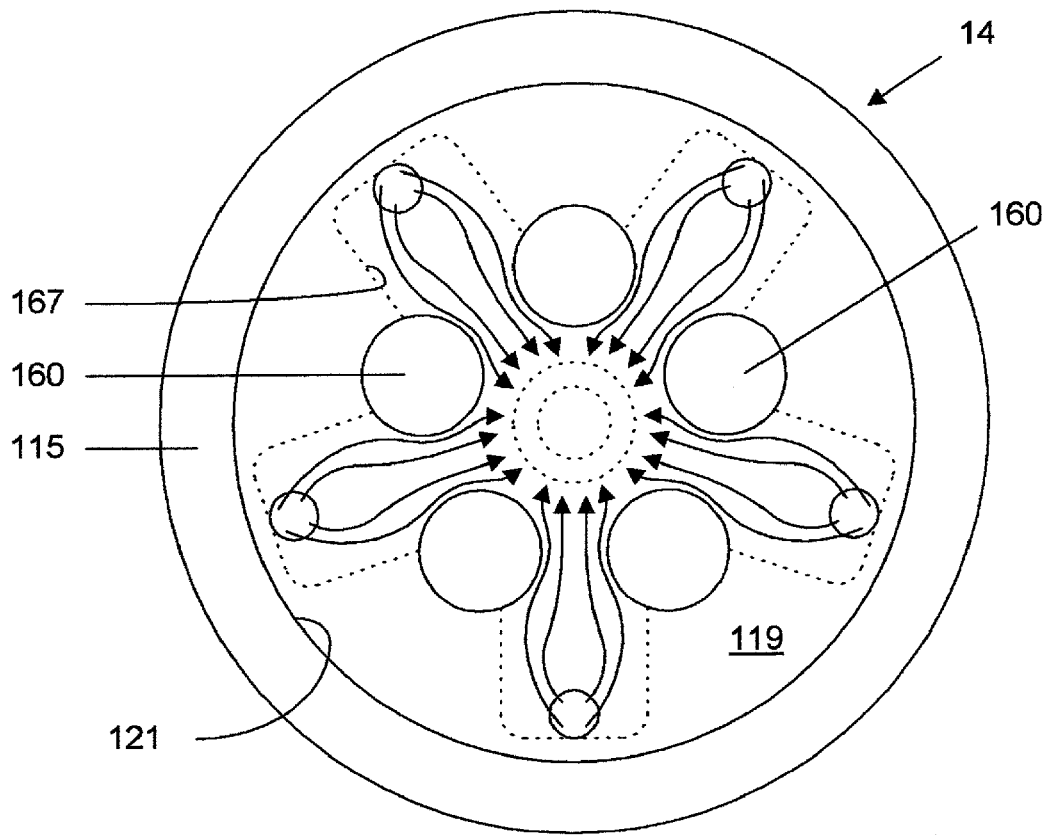
FIG. 6 is a diagrammatic, cross-sectional view taken generally along lines 6-6 of FIG. 5.

FIGS. 5 and 6 show an alternative embodiment of the stationary or bottom end wall 119 in which channels 167 are formed in the bottom end wall 119 to achieve static mixing of the plastic melt. The channels 167 open into the plasticizing vessel cavity 121 proximate the inner wall of the sleeve 115 and then flow into and communicate with the main passageway 157 of the nozzle 94.

Referring again to FIG. 4, the plunger 117 of plasticizing vessel 14 may include a heating element which may be secured to or mounted in the plunger 117 to heat the plunger 117. The plunger 117 includes an upwardly projecting circumferential rim 174 with bayonet slots 175 formed therein to permit relatively quick and easy connection or coupling of the piston head 56 of the ejection assembly 18 to the plunger 117.

The piston 54 of the first hydraulic actuator 51 is selectively advanceable between a retracted position wherein the piston head 56 is spaced above the upper surface of the plasticizing vessel plunger 117 (as shown in FIG. 1) and an intermediate extended position in which the piston head 56 abuts against the upper surface of the plasticizing vessel plunger 117, with a layer of rigid insulation 177 positioned between the upper surface of the plasticizing vessel plunger 117 and the end of the piton head 56. The layer of rigid insulation 177 includes holes 178 for receiving and sliding past the cores 160. The layer of insulation 177 prevents overheating of the injection assembly actuator 51.

Figure 7:
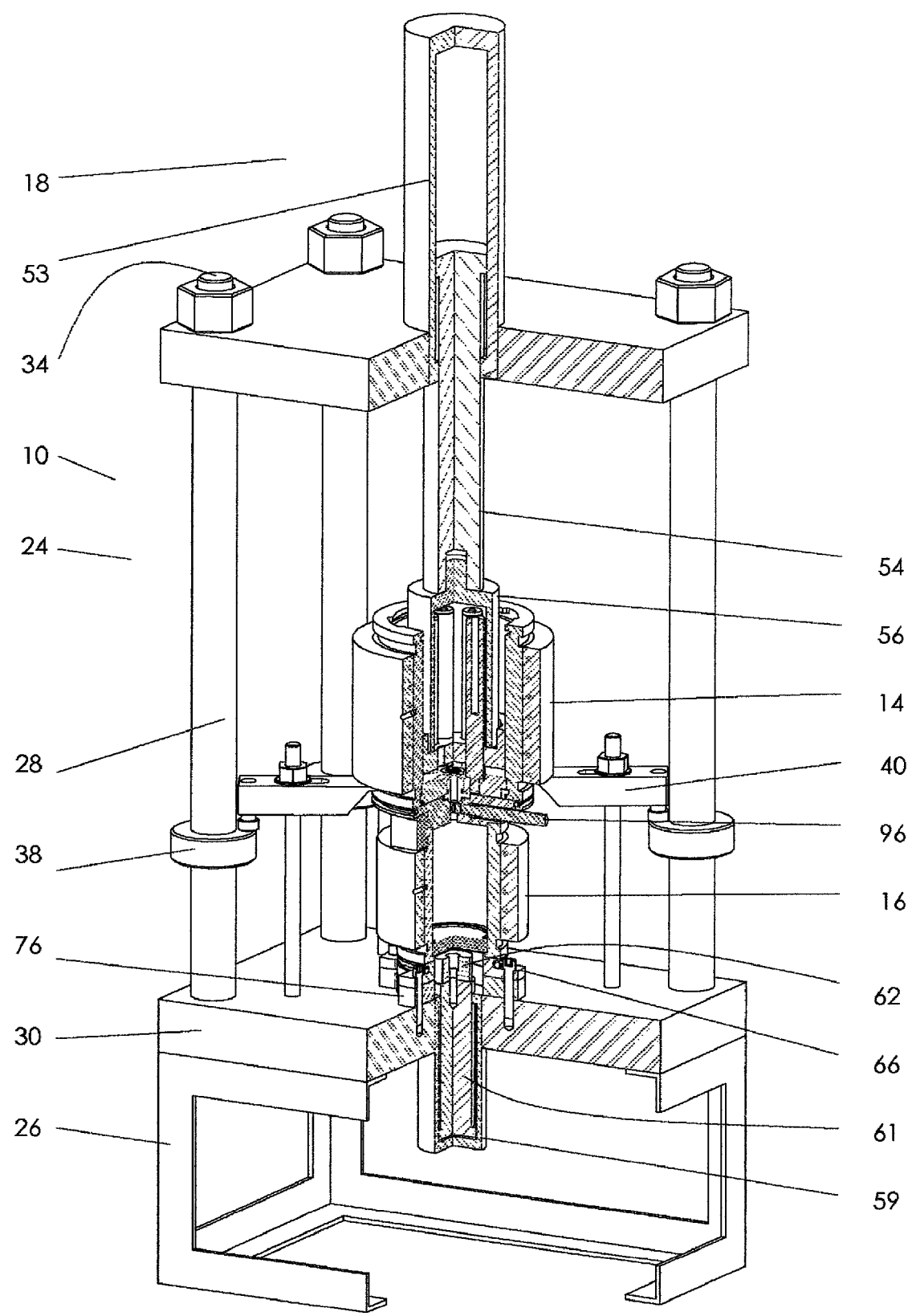
FIG. 7 is a perspective view similar to FIG. 1 showing a piston of an ejection actuator in an extended position advancing a plunger of the plasticizing vessel toward an outlet end wall of the plasticizing vessel for ejecting polymer work material from the plasticizing vessel.

The piston 54 is further advanceable to a fully extended position wherein the plunger 117 is driven into engagement with the bottom end wall 119 of the plasticizing vessel 14. Referring to FIG. 7, the piston 54 is shown advanced to nearly a fully extended position. Connection of the piston head 56 to the plunger 117 permits retraction of the plunger 117 out past the end of the plasticizing vessel sleeve 115 upon retraction of the piston 54 from the fully extended position or the intermediate extended position, to the fully retracted position. It is noted that the top lock ring 130 must be removed from the metal sleeve 115 prior to removal of the plunger 117 therefrom upon retraction of the piston 54 to the retracted position.

When the plasticizing vessel 14 is placed on the inlet end wall 70 of the mold 16 as generally shown in FIG. 1, the outer surface of plasticizing vessel bottom end wall 142 abuts against the upper surface of the mold inlet end wall 70. The nozzle 94 extends into the hemi-spherical depression 93 of the sprue 92 with a relatively small clearance therebetween. A relatively wider diameter locating hole 180 of inlet end wall 70 assists to the primary engagement of the nozzle 94 with inlet end wall 70. With the plasticizing vessel 14 properly positioned on the displacement-injection mold 16, the plasticizing vessel 14 and mold 16 may be secured in place on the frame 24 using the clamping assemblies 40. In particular, the clamp members 42 are positioned to engage the plasticizing vessel 14 such that the lip 45 of each clamp member 42 extends into the lower circumferential channel 128 in sleeve 115.

Figure 8:
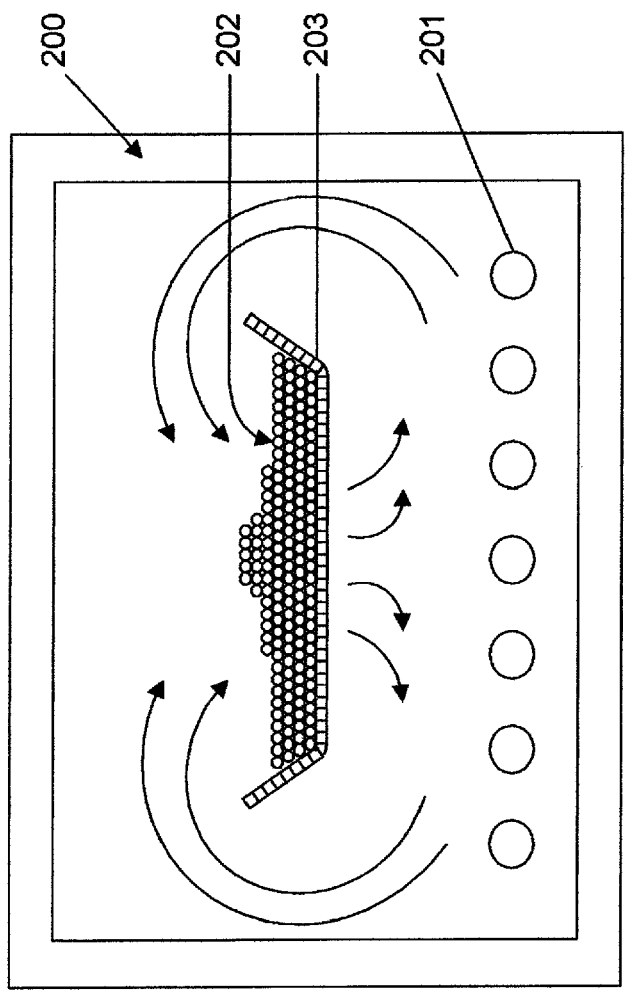
FIG. 8 is a schematic view of a conventional oven for use in preheating and drying plastic granules for further heating in and ejection from the plasticizing vessel of the displacement-injection molding system.

Molding Process: The pellets or granules of the work material used in the plasticizing vessel 14 are preferably preheated prior to placement in the plasticizing vessel. The pellets or granules may be preheated by conventional heating means, such as convection oven 200 utilizing gas burners or electrical heaters 201 with air circulation as shown diagrammatically in FIG. 8. The polymer granules or pellets 202 are shown on a tray or conveyor belt 203 and may be preheated by such conventional means to or above the heat deflection temperature, which corresponds to the temperature at which the plastic generally becomes pliable but not yet a liquid. The heat deflection temperature at 264 Psi, $T_{deflection}$, a glass-transition temperature $T_g$, melting point temperatures $T_{melt}$ and process temperatures $T_{process}$ of some crystalline and amorphous high performance thermoplastics for which the molding system of the present invention is particularly well adapted for processing are set forth in the following table 1:

TABLE 1

|  | Ultem 1000 | Torlon 5530 | Ketron PEEK | Semitron ESd 420 |
| --- | --- | --- | --- | --- |
| $T_{deflection}$, °F. | 400 | 520 | 450 | 410 |
| $T_g$, °F. | 419 | 527 | N/A | 428 |
| $T_{melt}$, °F. | N/A | N/A | 644 | N/A |
| $T_{process}$, °F. | 600 | 650 | 750 | 610 |

Figure 9:
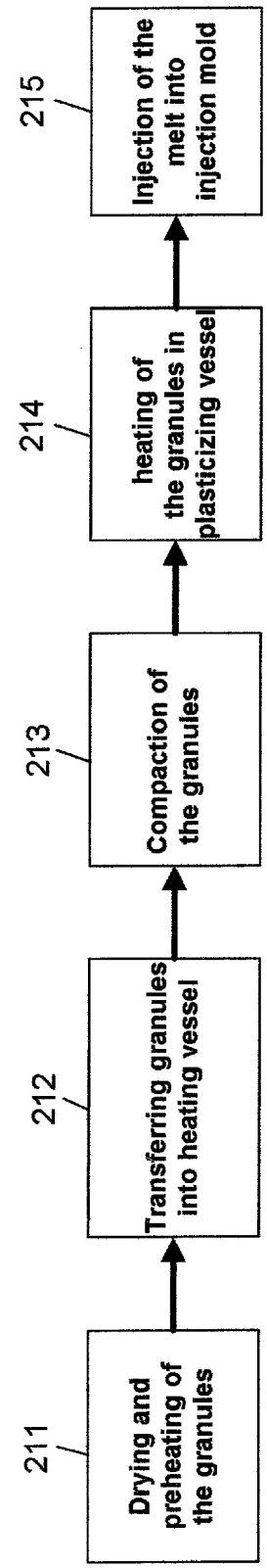
FIG. 9 is a schematic view of successive steps of the displacement-injection molding process of the present invention.

After drying and preheating of the granules, pellets or powder in the conventional oven 200 with air circulation, as shown schematically in FIG. 9 at 211, the work material is transferred to the plasticizing vessel 14 at 212. Granules are poured by gravity or by means of a feed tube into the plasticizing vessel cavity 121. Although not shown, it is foreseen that the preheated granules may be transferred to the plasticizing vessel 14 by various automated transfer means, including belt or screw conveyors. To prevent the temperature of the granules from dropping below the heat deflection temperature upon placement in the plasticizing cavity 14, the plasticizing vessel 14 should be preheated to that temperature or above.

While the plasticizing vessel 14 is being preheated, the mold sidewall 68, mold inlet end wall 70 and the moveable mold wall 71 are preheated by their bendable cartridge or band heaters to a desired temperature, which provides for quality cavity filling without wrinkles or welding lines. The temperatures of these mold members 68, 70 and 71 are determined by trial for each particular plastic material and are generally close to the injection temperature of the melt.

After preheating of the plasticizing vessel 14 and the mold 16, the piston 54 with attached extension head 56 is extended to abut against the plasticizing vessel plunger 117 and with the lugs 57 on head 56 extending into the bayonet slots 175 in the upstanding rim 174 of plunger 117. The head 56 is then rotated 45° to connect the head 56 to the plunger 117 with a bayonet type connection. The top lock ring 130 is removed from the sleeve 115 and the piston 54 is retracted to withdraw the top plunger 117 from the plasticizing vessel 14. As discussed above, a first selected quantity of preheated plastic pellets, granules or powder is transferred from the preheating assembly and poured into the plasticizing vessel cavity 121.

At this stage of operation valve 96 in the inlet end wall 70 of mold 16 is usually in a closed position from the previous shot or it must be closed to prevent polymer pellets from dropping in to the opened mold 16. The piston 54, with the plunger 117 connected thereto is extended until it engages and compresses the polymer granules in the plasticizing vessel cavity 121 as shown schematically at 213 in FIG. 9. A second quantity of preheated work material may be added into plasticizing vessel cavity 121 and compacted as the first quantity to increase the shot capacity.

The top lock ring 130 may be connected to the sleeve 115 to prevent inadvertent removal of the plunger 117 from the sleeve 115. All of the heaters of plasticizing vessel 14 including the cores 160 are then activated to heat the compacted work material contained therein as shown schematically at 214 in FIG. 9. The temperature settings of each heater are set to be equal to the injection temperature of the work material and are controlled by a PLC or standard multi-zone electronic temperature controllers sold, for example, by D-M-E Corporation. The bottom lock ring 141 connected to the sleeve 115 prevents the bottom end wall 119 from being forced out of the sleeve 115 during compaction and injection stages.

Once the polymer work material is heated to its injection temperature, all of the heaters of plasticizing vessel 14 are turned off. The piston 61 of back pressure assembly 20 is actuated to drive the mold plunger 71 upward and into engagement with the mold inlet end wall 70. When the mold plunger 71 is advanced upward, air contained in the mold cavity 69 escapes or is vented through vent holes (not shown) located at the interfaces of the inlet end wall 70 and mold plunger 71 with the mold sidewall or sleeve 68. The back pressure exerted on the mold plunger 70 by the piston 61 is generally maintained constant during the injection and cooling stages.

The valve 96 in the mold inlet end wall 70 is opened by turning it 90° in either direction to align a through hole in the valve 96 with the passageway of the sprue 92. The actuator 51 of injection assembly 18 is actuated and piston 54 with attached piston head 56 and plasticizing vessel plunger 117 connected thereto are extended to drive the plunger 117 toward the stationary end wall 119 of the plasticizing vessel, forcing the molten work material out of the plasticizing vessel cavity 121, through the nozzle 94, through the sprue 92 and into the closed mold cavity 69 as represented schematically in at 215 in FIG. 9. Forward pressure on the plasticizing vessel plunger 117 exceeds the back pressure on the mold plunger 71 allowing the melt to flow in the direction to the mold cavity 69. As the molten work material is forced into the mold cavity 69 under pressure, the work material drives the mold plunger 71 rearward against the back pressure exerted thereon by the back pressure assembly 20 including by the second linear actuator 59. To prevent damage to the back pressure assembly 20, a relief valve (not shown) should be connected to the hydraulic fluid supply lines for the back pressure linear actuator 59.

The back pressure should be high enough to prevent the formation of air voids and porosity due to hot gases in the work material injected into the mold cavity 69. The difference between the forward pressure exerted by the plasticizing vessel plunger 117 and the back pressure exerted by the mold plunger 71 should be greater than the pressure drop through the sprue 92 and the nozzle 94 due to the viscosity of the melt. Under these preferred conditions, the flow of the melt from plasticizing vessel cavity 121 to the mold cavity 69 may be characterized as displacement rather then injection. In a conventional injection molding process the melt is injected into the mold cavity only under the forwardly directed injection pressure. The process of displacement molding is schematically illustrated in FIG. 10a-c. FIG. 10a shows the relative positions of the movable plasticizing vessel or top plunger 117 and the mold or bottom plunger 71 at the beginning of the injection or displacement process. FIG. 10b shows intermediate positions of the top and bottom plungers 117 and 71 during displacement of the melt. Final positions of the top and bottom plungers 117 and 71, after displacement or injection is completed are shown in FIG. 10c.

When the mold plunger 71 reaches its fully retracted position at the base mounting flange 66, the melt displacement is accomplished. Full displacement or filling of the mold may be determined by a sudden increase in forward pressure. At this moment the valve 96 is closed by turning it 90° in either direction to close the sprue 92.

To prepare the mold 16 for transportation to the cooling station 12, after closing the valve 96, the dove tail clamps 109 are installed to clamp the mold inlet end wall 70 to the mold sidewall 68. Piston 61 of back pressure assembly 20 is fully retracted, separating the piston 61 from the mold plunger 71 and releasing the back pressure. The clamping members 42 are repositioned to engage the mold 16, along either the upper or lower circumferential grooves 87 or 89 of the mold sidewall 68, and secure the mold to frame 24. With the piston head 56 of injection assembly piston 54 still connected to the plasticizing vessel 14, piston 54 is fully retracted, raising and separating the plasticizing vessel 14 from the mold 16 and breaking the plastic extending from the nozzle 94 of the plasticizing vessel 14 into the sprue 92 of the mold 16. The plastic in this passageway is sometimes also referred to as the sprue. The clamping members 41 are released from clamping engagement with the mold 16 and the mold may be transported to the cooling station 12 (See FIG. 2) for cooling. A second mold 16 may then be placed into the molding station 10 for the next preheating cycle, while the previous mold 16 is cooling down in cooling station 12.

The cooling station 12 includes a frame 220 which is shown resting on a pedestal or base 221. Cooling station frame 220 comprises a set of tie bars 222 which are fixedly connected to and extend upward from a base plate 225 to an upper plate 226. A cooling station linear actuator 228, including a hydraulic cylinder 229 and a piston 230 with a removable piston head 231 is mounted on the upper plate 226 of the frame 220 with the piston 230 extending downward or inward through a hole in the upper plate 226.

The mold 16 transferred from the molding station 10 is positioned on top of a support flange 232 which is supported on and separated from the mold frame base plate 225 by a rigid insulating layer 233. An upper end of the support flange 232 is smaller in diameter than the mold cavity 69 and engages the mold plunger 71 when the mold 16 is positioned on the upper spacer support flange 232.

Immediately after positioning the mold 16 in the cooling station 12, an extension tube 237 and one or more rigid insulating discs 239 may be positioned on top of the inlet end wall 70 of the mold 16 and aligned with the piston head 231. The piston 230 is then extended until the piston head 231 engages the extension tube 237 which drives the mold 16 downward pressing the mold plunger 71 against the support flange 232 and compressing the molten plastic in the mold cavity 69.

The amount of pressure applied depends on the work material and should be high enough to prevent the formation of air voids and pores in the molded part and to prevent delamination of the molded part. For example, the holding pressure for PEEK 30% CF during the cooling stage is 2,000 psi and may be higher for other grades with higher percentage of carbon or glass fibers. The holding pressure should be maintained until mold temperature gradually drops to the mold opening temperature. Special precautions should be taken to provide an equal cooling rate for all of the mold members as well as the support flange 232 of cooling station similar to base mounting flange 66 of the injection station. The support flange 232 may be provided with an electrical cartridge heater 242 to control the temperature of the support flange 232. The electric heaters of the mold inlet end wall 70 and the band heater 85 of the mold sidewall 68 should also be controlled in such a way to provide uniform cooling at desired cooling rate of the molded part. Programmable logical controllers (PLC) may be efficiently employed for this purpose. When the molded part is solidified and its temperature is brought under the heat deflection temperature, the mold may be opened and the molded part removed from the mold 16.

To remove the molded part from the mold 16, the cooling station piston 230 is first retracted which releases the pressure within the mold cavity 69. The extension tube 237 and insulating discs 239 are removed from between the piston head 231 and the mold inlet end wall 70. Steps are then taken to remove the inlet end wall or upper flange 70 from the rest of the mold 16. The dovetail clamps 109 are removed from the mold 16 and the piston head 231 is replaced with a flange remover, not shown. The mold 16 is clamped to the cooling station frame base plate 225 using clamping assemblies or clamps 245 which are similar in construction to clamping assemblies 40. The flange remover is attached to the mold inlet end wall or upper flange 70 and the piston 230 is retracted to separate the mold inlet end wall 70 from the sleeve 82 which breaks the plastic solidified in the sprue 92.

The clamping assemblies 245 are then disengaged and the mold 16 is engaged by the flange remover and raised. A second extension tube (not shown) is positioned beneath the mold 16 in engagement with the mold plunger 71. The piston 230 with the piston head 231 reattached is then extended to engage the metal sleeve 82 of the mold 16. The piston 230 is further extended to push the remaining portions of the mold 16 off of the molded part which extends upward into the hollow center of the piston head 231.

In successive cycles, the plasticizing vessel 14 generally does not have to be preheated prior to the pouring of the granules for the next shot as the plasticizing vessel 14 is sufficiently hot for compaction of the granules. However, because the mold was cooled to allow the molded part to solidify, all the mold members, including sleeve 82, inlet end wall 70 and mold plunger 71 are preferably reheated to a desired temperature as described above.

Effect of Heating Cores: The heating cores 160 extending into the plasticizing vessel cavity 121 significantly reduce the heating time required for equalization of the temperature throughout the entire volume of the plasticizing vessel cavity 121. When there are no cores in the vessel 14, heat is delivered to the relatively cold central region of compacted pellets only by thermal conduction through the pellets. The degree of compaction has a direct influence on the rate of heat transfer by thermal conduction.

Solid thermoplastic granules themselves have relatively low thermal conductivity due to physical properties of the polymer structure. The compacted polymer granules have an even lower thermal conductivity than the solid polymer due to the presence of thermal resistances on the interfaces between the granules and low thermal conductivity of the air trapped therebetween. The degree of compaction increases with the increase in applied pressures and temperatures of preheated pellets. The preheating temperature of the pellets prior to compaction has an upper limit since overheating of the pellets with excess air will cause undesirable oxidation or discoloration of the pellets, which will cause a reduction in quality of the molded product. Another disadvantage of overheating the pellets is the formation of agglomerates or clusters, which will cause difficulties in handling during transportation and pouring into the plasticizing vessel. For these reasons, the applied compaction pressure should be as high as practical. The degree of compaction is still limited even with high pressures because the air trapped therebetween will expand after removing the applied pressure causing the reduction of the degree of compaction. The existing limits on the degree of compaction of the pellets results in increased heating time required to heat the pellets to the injection temperature in the plasticizing vessel 14. The heating time of the pellets is longer then may be expected for solid polymer piece.

The primary purpose of employing the cores 160 in the plasticizing vessel 14 is to deliver the heat directly to the central region of compacted pellets using the advantage of the metal cores 160 having much higher thermal conductivity compared to that of the polymer pellets. These metal cores 160 may be heated by conduction from the other mold members as discussed previously or separately by electrical cartridge heaters 163 inserted into the cores 160, which will significantly reduce the heating time. The significant reduction of heating time may be obtained due to the following: delivery of additional heat directly to the central region of the compacted work material and the reduction of the distance of the heat flow by thermal conduction.

To estimate the effects of the cores on the improvement of the heating process, the transient heat transfer process in the plasticizing vessel 14 a single core may be compared to a vessel without a core. An analytical solution of the problem may be found, for example, in the book "Conduction of Heat in Solids" by H. S. Carslaw and J. C. Jaeger, New York, Oxford University Press, 1947. However, because the analytical solution is too complex for the scope of this description, the numerical method of Finite Differences for transient heat transfer calculations is used herein. This method is described in detail, for example, in the book "Heat-Transfer Calculations by Finite Differences" by G. M. Dusinberre, Scranton, International Textbook Co., 1961.

Figure 11:
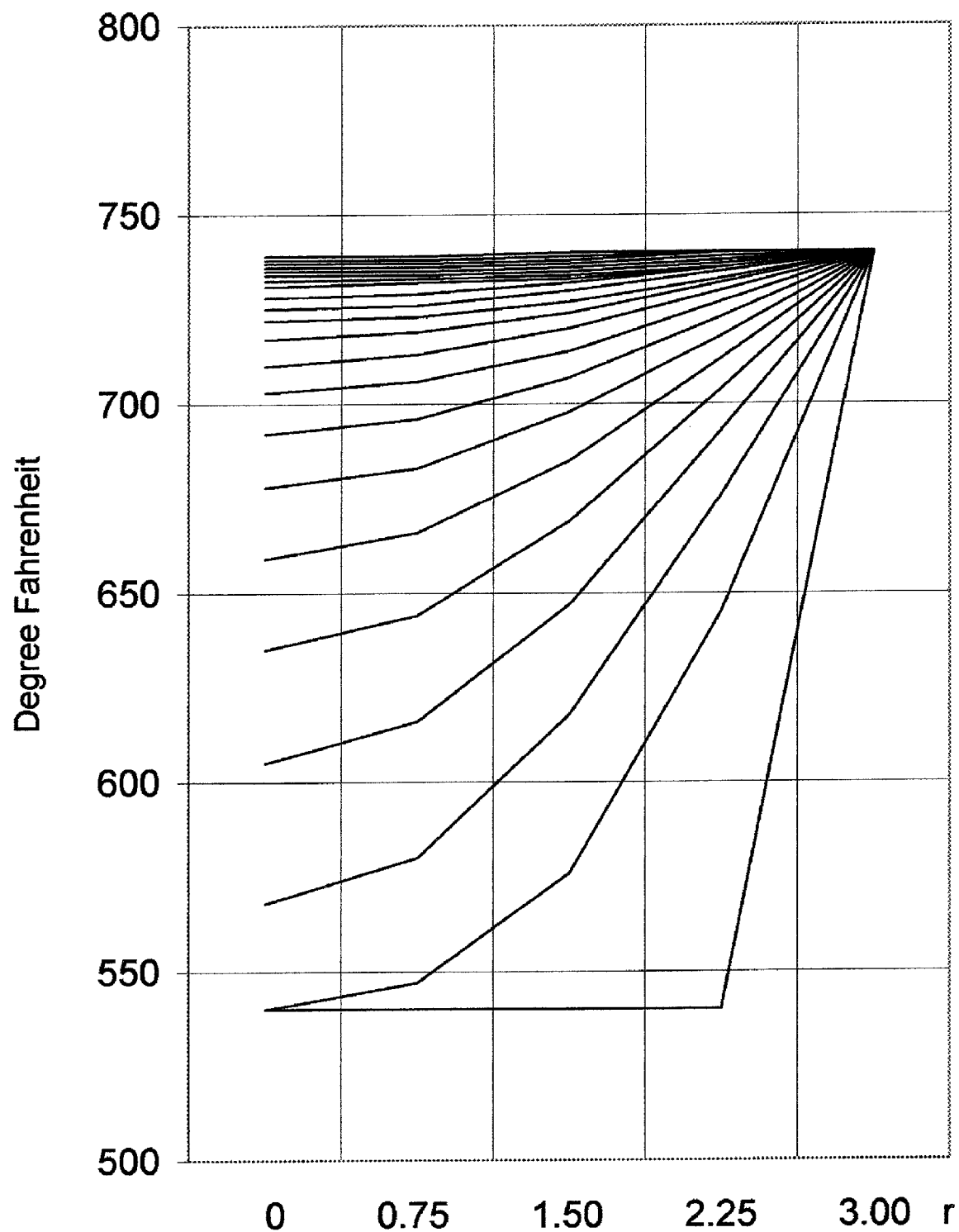
FIG. 11 is a diagram including a set of curves showing the temperature distribution inside the plasticizing vessel without a heat transfer core at different times during transient heat transfer.

A first sample calculation, is based upon use of pellets of PEEK (polyetheretherketone) which are preheated to the heat deflection temperature 540° F. as described above and compacted in the plasticizing vessel 14 at this temperature. The temperature of the vessel's sleeve 115 is initially at the desired injection temperature, which is 740° F. for PEEK and remains constant during heating time. The inner radius of the sleeve is equal to 3 inches. The edge effects are neglected and heat flow is considered as radial one-dimensional in the direction toward the central axis of the sleeve. Transient heat transfer temperatures were calculated for given initial conditions and are shown in FIG. 11. The temperatures are calculated in 5 points spaced equally in the direction of the flow by intervals $\Delta r=0.75$ inches. Left point corresponds to the central axis of the sleeve 1, while right one to its inner surface. Time intervals between series of lines are equal to:

$$\Delta \tau_1 = \frac{3}{4} \cdot \frac{c\rho}{k} \cdot (\Delta r)^2$$

where:
c—is specific heat of compacted pellets, Btu/lb ° F.;
ρ—is the density of compacted pellets, lb/cu ft;
k—is thermal conductivity of compacted pellets, Btu/hr ft ° F.

As can be seen from FIG. 11, it requires 22 time increments $\Delta \tau_1$ to equalize the temperature in the entire volume of the vessel 14 without the core with total heating time $$t_1 = 22 \cdot \frac{3}{4} \cdot \frac{c\rho}{k} \cdot (\Delta r)^2$$

Considering the case with a single core 160 of diameter 1.5 inches inserted into the center of the same vessel 14 containing pellets of PEEK with the same degree of compaction.

Figure 12:
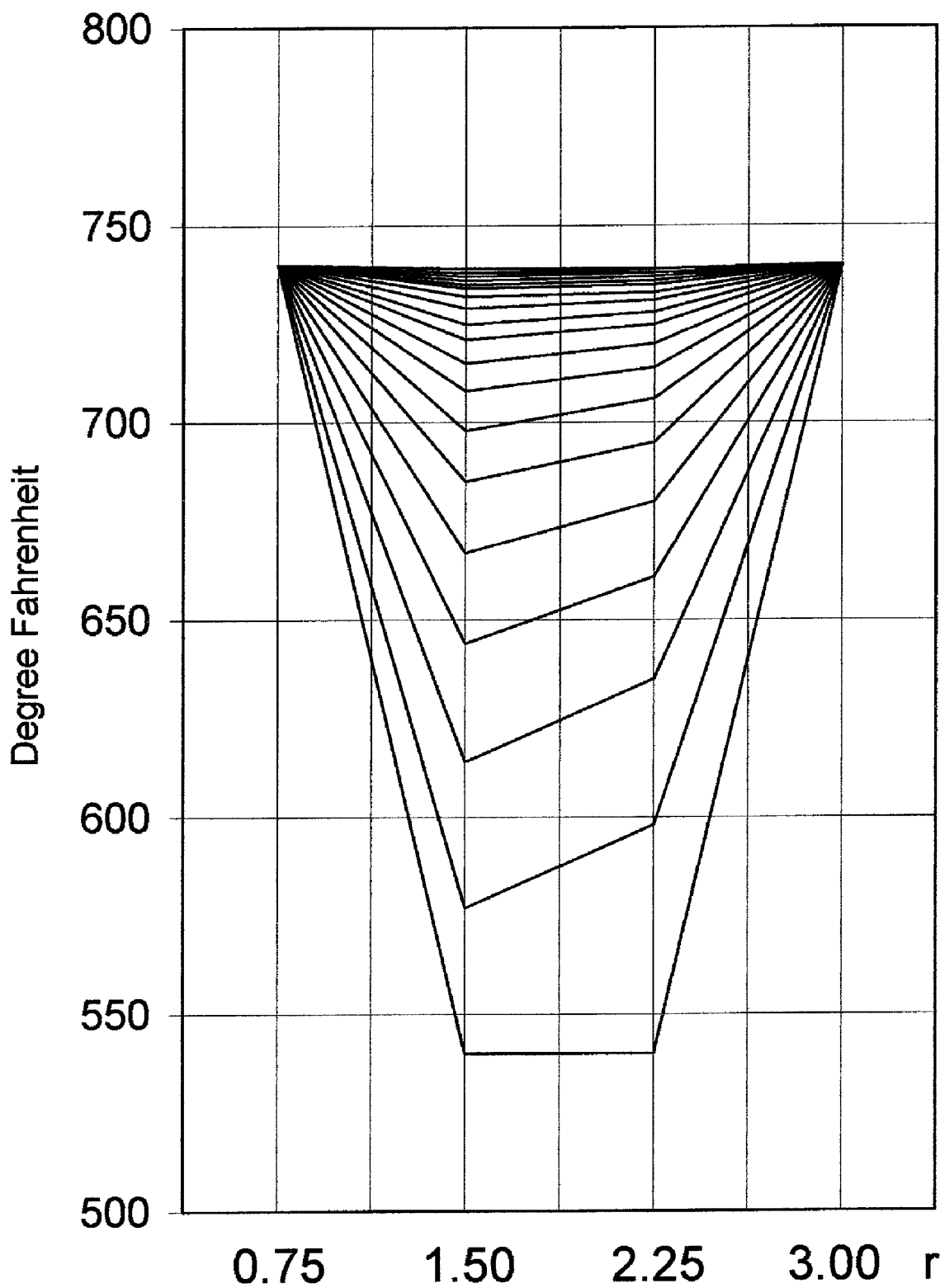
FIG. 12 is a diagram including a set of curves showing the temperature distribution inside the plasticizing vessel with a heat transfer core at different times during transient heat transfer.

Initial temperatures of the compacted pellets and the vessel 14 are the same as in the first case and are 540° F. for pellets and 740° F. for the sleeve 115 of the vessel 14. The initial temperature of the core 160 is also equal to 740° F. and remains constant during the heating time. Transient heat transfer temperatures were calculated for given initial conditions and are shown in FIG. 12. The temperatures are calculated in 4 points spaced equally in the direction of the flow by intervals $\Delta r=0.75$ inches. Left point corresponds to the surface of the core while the right point corresponds to the inner surface of the vessel 14. Time intervals between series of lines are equal to:

$$\Delta \tau_2 = \frac{1}{4} \cdot \frac{c\rho}{k} \cdot (\Delta r)^2$$

As can be seen from FIG. 12, it requires 20 time increments $\Delta \tau_2$ to equalize the temperature in the entire volume of the vessel 14 containing the core 160 with the total heating time $$t_2 = 20 \cdot \frac{1}{4} \cdot \frac{c\rho}{k} \cdot (\Delta r)^2$$

The insertion of one core 160 having a diameter of 1.5 inches reduces the heating time more then 3 times, while the volume capacity of the vessel is reduced by only 6%. If several cores 160 of smaller diameter are inserted, the effect of the reduction of heating time will be even more significant due to reduced distances between hot surfaces and, hence, reduced distances of heat flow.

A displacement-injection molding system utilizing conventional electrical heaters for heating and molding thermoplastics was built similar to the embodiment discussed above and shown in FIG. 1. This molding system was used for molding round parts having a diameter of 4 inches and 6.5 inches in length, from pellets of high performance engineering thermoplastic, PEEK CF 30%. Two variations of the plasticizing vessel 14 were tested in this system.

In the first design, the plasticizing vessel 14 contained a single core having a diameter of 1.5. The core 160 was centrally located relative to the stationary end wall 119 generally in alignment with the nozzle 94. This core contained side holes connected to the nozzle hole to permit the molten plastic to flow from the vessel 14 into the mold cavity 69. The second plasticizing vessel 14 included five cores 160 and was constructed in the manner discussed above and as generally shown in FIG. 4. The volume reduction of the plasticizing vessel cavity 121 due to the five cores was 14% compared to 6.2% for the single core of diameter 1.5 inches. The heating time for the five core design was reduced to thirty minutes which was approximately one sixth of the heating time for a vessel with a single core and one eighteenth the heating time for a vessel without heating cores. Molded parts made by the use of the displacement injection molding system also exhibited improved mechanical properties and dimensional stability in comparison with similarly shaped parts made by compression molding.

Displacement Mold for Forming Hollow Tubes: Turning to FIGS. 13 and 14 there is shown an alternative embodiment of a mold 251 which may be used to mold relatively thick walled hollow tubes 252 from the work material as generally shown in FIG. 14. The tube forming mold 251 includes a base mounting flange 255, a mold sidewall 256, defining a variable volume mold cavity 257, an inlet end wall or upper flange member 258 a central, cylindrical core 259 and a moveable mold member, wall or plunger 260 slidably mounted between the mold sidewall 256 and the central core 259 to vary the volume of the mold cavity 257. The central core 259 of tube forming mold 251 is removably connected to and extends along a central axis of the mold 251 from the inlet end wall 258 of the mold 251 past the opposite end of the mold sidewall 256 and through a central opening in the base mounting flange 255. The mold plunger 260 is annular and slides over the central, cylindrical core 259. Electric heaters, such as cartridge heaters (not shown) may be used for heating the mold 251. For example, a bendable cartridge heater (not shown) may be mounted within a groove 262 in the mounting flange 255 for heating the flange 255 and adjacent portions of the mold sidewall 256. A band heater (not shown) is preferably secured around the mold sidewall 256 to heat the sidewall 256 similar to the band heater 85 as shown in FIG. 3. In addition, linear cartridge heaters (not shown) may be inserted in bores 291 and 292 formed in the inlet end wall or upper flange 258 of the mold 251 to heat the inlet end wall 258 and the core 259.

The inlet end wall or upper flange 258 of the mold 251 includes a sprue 264 extending centrally therethrough with a valve 265 for selectively opening and closing the sprue 264. Upstream of the valve 265, the sprue 264 comprises a single central passageway and downstream of the valve 265 the sprue branches out into four channels or runners 267 which distribute and deliver molten plastic flowing therethrough to the mold cavity 257 through several (four shown) separate outlets spaced 90 degrees apart and past the central core 259.

A back pressure head or piston extension member 270, adapted to be supported on the end of the piston 261 of the back pressure assembly 20 is used for acting on the annular mold plunger 260. The back pressure head 270 includes a cylindrical base 272 sized to conform to the end of the piston 261 and several cylindrical fingers 274 (four shown) projecting upward therefrom. The back pressure head 270 is positioned on the end of the piston 261 and advanced upward until the fingers 274 extend through aligned finger receiving bores 276 formed in the base mounting flange 255 and into engagement with a lower surface of the annular plunger 260. The finger receiving bores 276 are equally spaced around the hole in the mounting flange 255 for the central core 259. Abutment of the annular plunger 260 against the upper surface of the base mounting flange 255 prevents the plunger 260 from sliding past a lower end of the mold sidewall 256.

After the members forming the mold 251 are preheated, the piston 261 of back pressure assembly 20 is fully extended to advance the annular mold plunger 260 in close proximity to the mold inlet end wall 258. The valve 265 is opened and molten plastic is injected into the mold 251 at a forward pressure which exceeds the back pressure acting on the annular mold plunger 260 so that the molten plastic causes the piston 261 to retract increasing the volume of the mold cavity 257 in proportional relationship to the amount of plastic injected therein. Molten plastic is injected into the mold 251 until the annular plunger 260 engages the base mounting flange 255 at which point the mold cavity 257 has reached its maximum volume.

The contents of the mold 251 are maintained under pressure as the mold is allowed to cool. Once the contents of the mold have cooled a sufficient amount to be removed from the mold 251, the pressure thereon is released and the molded part is removed from the mold 251. The steps of cooling the mold and removing the molded part from the mold 251 may be performed at a cooling station similar to cooling station 12 discussed previously.

To hold the contents of the mold 251 under pressure at the cooling station 12, the back pressure head 270 may be positioned between the mold 251 and the frame base plate 225, with the fingers 274 of the head 270 engaging the annular mold plunger 260. The piston head 231 is then advanced into engagement with the inlet end wall or upper flange 258 of the mold 251 to press downward on the mold 251, compressing the annular mold plunger 260 against the back pressure head fingers 274.

After the molded part has cooled to a sufficient degree to permit removal, the piston 230 is retracted, and the mold 251 is clamped to the base plate 225. A flange remover is then connected to the piston 230 and to the upper flange or inlet end wall 258 of the mold 251. The piston 230 is then retracted to separate the upper flange 258 from the mold sidewall and break the hardened plastic sprues formed in the sprue channels 267. The piston head 231 is then reattached to the piston 230 and the mold is positioned on the back pressure head 270. The piston 230 is then extended to push the mold sidewall 256 off of the molded part. The core 259 may remain positioned within the hollow tube but may be removed using tools adapted for use with the piston 230 of the cooling station.

It is also foreseen that the core could be a collapsible core 280 such as the collapsible core shown in FIG. 15. The core 280 includes outer core portions 281 and 282 and a central core member or portion 283 which may be assembled together to form a generally cylindrical core. After separation of the molded part and core 280 from the remaining portions of the mold 251, one or more tools, including the piston 230, can be used to force the central core portion 283 out from between the outer core portions 281 and 282. The outer core portions 281 and 282 then collapse and are readily removable from the hollow portion of the molded tube.

It is to be understood that while certain forms of the present invention have been illustrated and described herein, it is not to be limited to the specific forms, process steps or arrangement of parts described and shown and that the invention should be limited only by the claims. It is to be understood for example that the injection system could be utilized without a cooling station and the mold can cool down in the injection station. Such a simplified system nevertheless will have a prolonged process time.

It is also foreseen that the heating cores such as cores 160 can take a wide variety of shapes and geometries. Similarly, the cross-section of the circumferential sidewall 68 of the mold 16 and sidewall 125 of plasticizing vessel 14 may take a wide variety of shapes including rectangular, triangular or ovate or other more complicated geometries. The term circumferential is not intended to be limited to circular shapes but intended to include other geometries as indicated above. Although the molding process of the present invention is particularly well adapted for molding parts of stock shapes and uniform cross-section, it is to be understood that the process could be utilized to mold parts of more complicated shapes. To mold parts of more complex shapes, multiple mold plungers could be utilized which would then stop at different positions within the mold cavity.

Although the mold sidewall 68 and inlet end wall 70 are described as being stationary with the mold plunger 71 moving relative to the sidewall 68 and end wall 70, it is foreseen that plunger 71 could be maintained stationery with the sidewall 68 and the end wall 70 moving relative to the plunger 71 to vary the volume of the mold cavity. In addition, it is foreseen that the plasticizing vessel utilizing core heating elements could be used without the variable volume mold and back pressure assembly, such as conventional injection molds. Similarly, the variable volume mold utilizing back pressure to avoid the formation of voids or pores could be used with different plasticizing vessels. Although the ejection mechanism shown and described herein is a plunger type mechanism it is to be understood that the term ejection mechanism is not intended to be limited to plunger type mechanisms and may include mechanisms such as screws or other functionally equivalent mechanisms, particularly when the variable volume mold assembly utilizing back pressure as disclosed in FIG. 3 is used with a plasticizing vessel other than that of the type disclosed in FIG. 4.

It is also to be understood that although the end walls of the plasticizing vessel 14 and the mold 16 are generally shown as planar, the end walls could be of a variety of configurations including conical, hemi-spherical or other geometries that generally extend across and close the circumferential sidewall.

Figure 16:
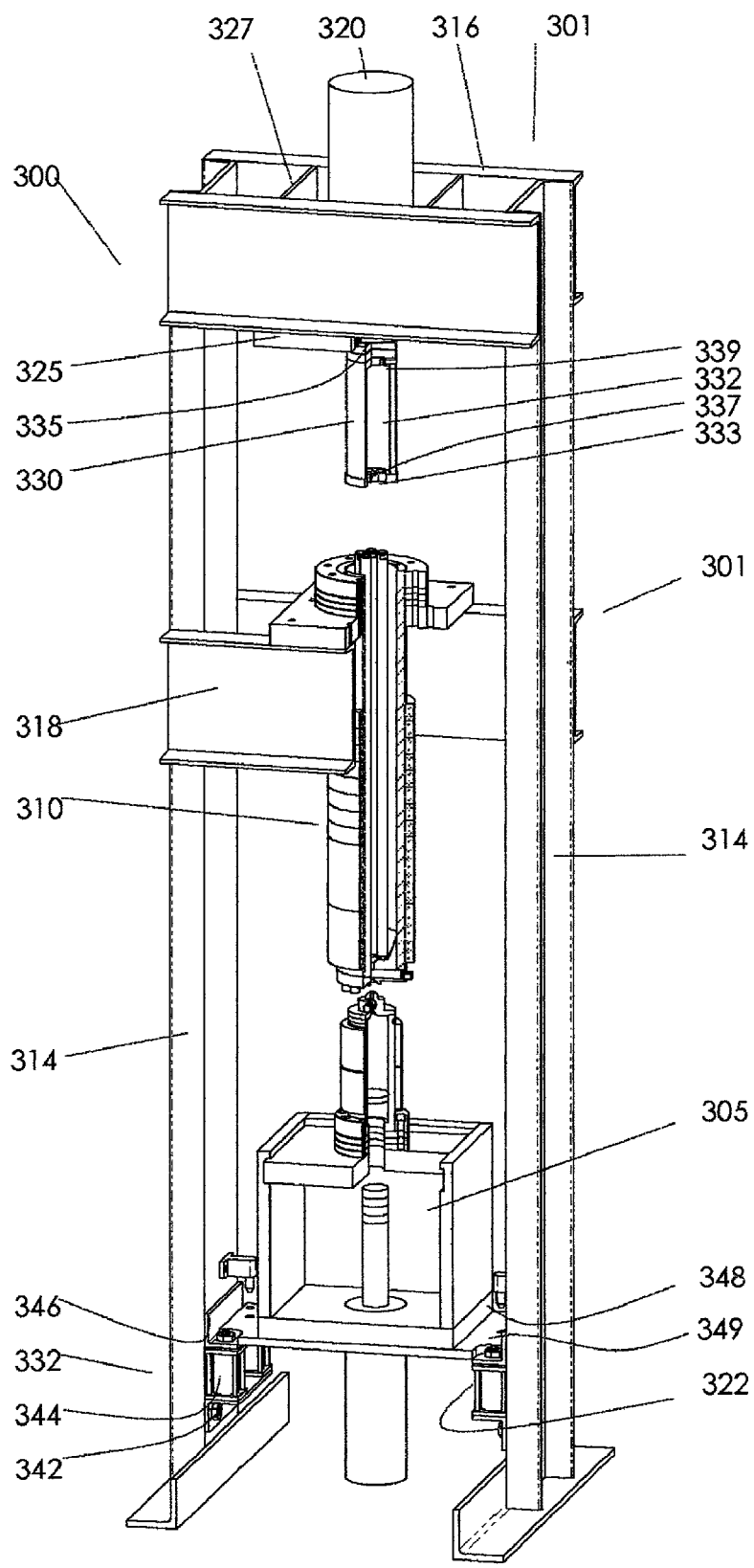
FIG. 16 is a perspective view of a an alternative embodiment of a displacement injection molding system including a mold mounted on a back pressure assembly positioned in line with a plasticizing vessel incorporated into an injection station, with portions removed to show detail therein.
Figure 17:
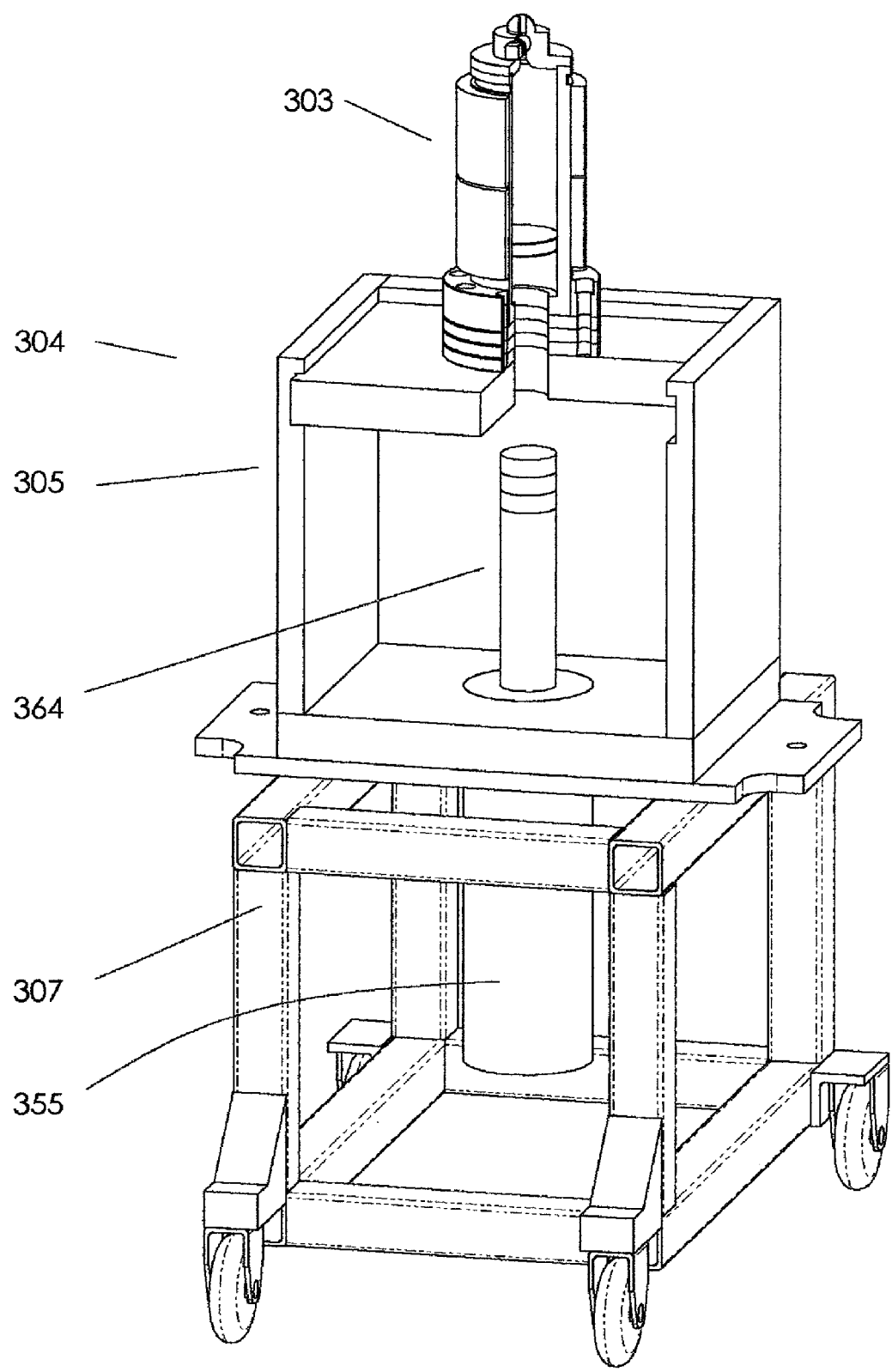
FIG. 17 is an enlarged, perspective view of the mold and back pressure assembly mounted on a cart for storing the mold separate from the injection station to facilitate cooling of the mold, with portions removed to show detail therein.

Alternative Embodiment with Multi-Zone Plasticizing Vessel: An alternative embodiment of the displacement-injection molding system 300 is shown in FIG. 16. This system 300 consists of an injection station 301 and a mold 303 mounted on a back-pressure assembly 305 which is removably securable to the injection station 301. The mold 303 and back-pressure assembly 305 may be removed from the injection station 301 and transported for cooling by means such as a cart 307 as shown in FIG. 17. The mold 303, back-pressure assembly 305 and cart 307 may collectively be referred to as cooling station 304.

The injection station 301 comprises a plasticizing vessel 310 mounted on a press assembly 312. The plasticizing vessel 310 is an improvement over the batch type plasticizing vessel 14 discussed above in that it includes multiple zones therein sized to receive a shot sized volume of plastic material to be gradually and continuously heated to an injection temperature as the plastic material is sequentially advanced through the barrel of the vessel 310 toward the injection outlet or nozzle 313.

The press assembly 312 includes two vertical frame members 314, two sets of horizontal bolsters 316 and 318, a hydraulic actuator or injection actuator 320 and mold lifting assemblies 322. The lower bolsters 318 mount the plasticizing vessel 310 to the press assembly 310. The injection actuator 320 is mounted on the press assembly 310 above and in alignment with the plasticizing vessel 310 by the upper horizontal bolsters 316. The lifting actuators 322 are mounted on the vertical frame members below the plasticizing vessel 310.

The back pressure assembly 305 with the mold 303 mounted thereon is removably securable on the lifting actuators 322 below the plasticizing vessel 310, such that the mold 303 may be lifted by two hydraulic lifting actuators 322 into flow communication with the plasticizing vessel 310 for injection of molten plastic from the vessel 312 into the mold 303. After injection is completed, the portable cart 307 may be moved in under the back pressure assembly 305 to remove it and the mold 303 attached thereto from the injection station 301 for cooling. When one mold 303 and back pressure assembly 305 is removed from the injection station 301, another mold 303 and back pressure assembly may be delivered and set in the place of the previous one to prepare for the next shot.

Referring to FIG. 16, injection actuator 320 is threadingly attached to and extends through the mounting plate 325 connected to the upper horizontal bolsters 316. Plate 325 may be welded or bolted to horizontal bolsters 316. Reinforcement plates 327 may also be used with the horizontal bolsters 316 and 318.

Figure 21:
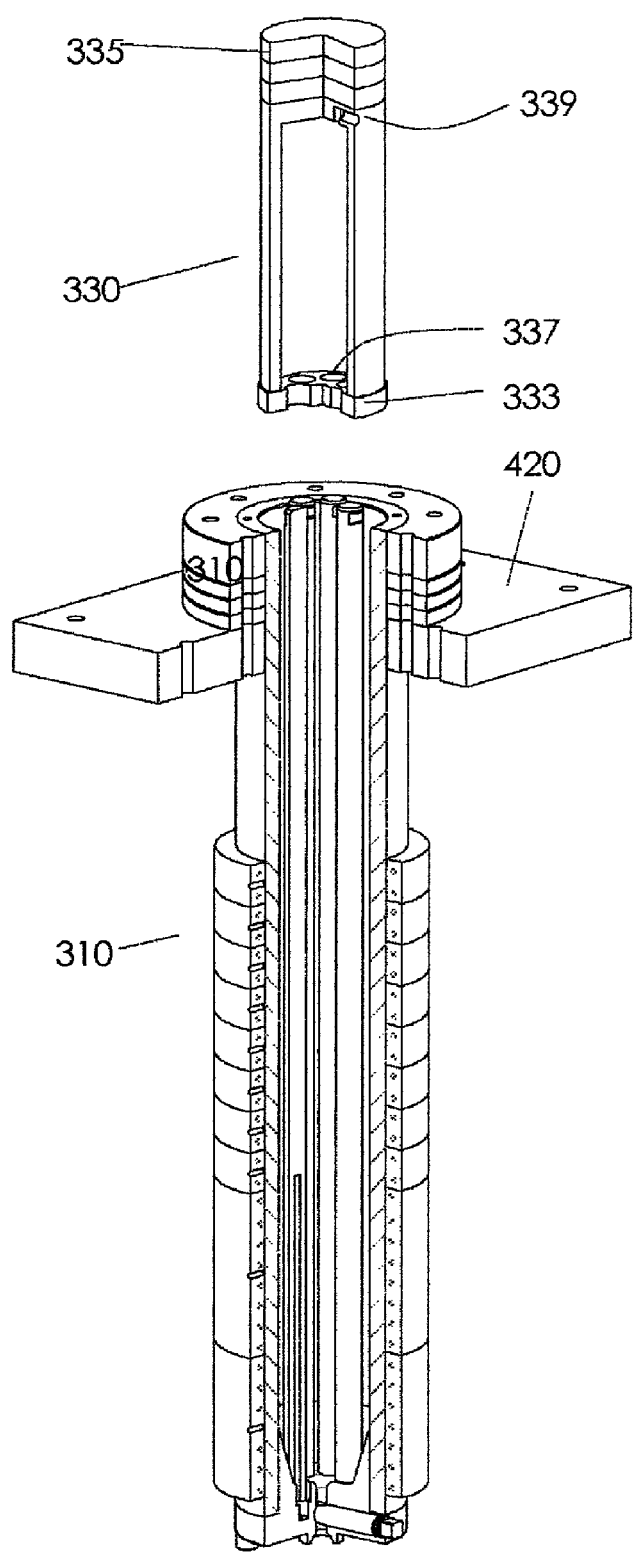
FIG. 21 is an enlarged and exploded perspective view of the plasticizing vessel of the alternative embodiment with portions removed to show detail and showing an injection plunger removed from a cavity of the plasticizing vessel.

Referring to FIGS. 16 and 21, a piston extension or head 330 (similar to piston head 56 discussed above) may be attached to the piston (not shown in this embodiment) of the hydraulic actuator used as the injection actuator 320, by means of bayonet connection (not shown). The piston head 330 consists of metal hollow cylinder 332 and injection plunger 333 made of hardened metal or alloy. Several mica insulation disks 335 are mounted on the hollow cylinder 332 and the actuator piston (not shown) to prevent the actuator piston from overheating. Piston head 330 is designed to allow the injection plunger 333 to advance into the cavity of the plasticizing vessel 310 during compaction of pellets and ejection of the melt from the vessel 310. The injection plunger 333 contains through holes 337 aligned with the vessel's cores (discussed below) to allow advancement of the injection plunger 333 deep into the cavity of the plasticizing vessel 310. Piston head 330 preferably contains a vacuum port 339 for applying a vacuum to the cavity of plasticizing vessel 310 through the piston head 330 prior and during compaction of pellets, allowing air to be removed from the cavity of the vessel 310 and preventing the entrapment of air in the melt.

One of the mold lifting assemblies 322 is mounted to each of the vertical frame members 314 near the lower ends thereof. Each lifting assembly 322 includes a stationary base 342, formed from a metal angle channel, two small hydraulic lift cylinders or actuators 344 secured on the base 342, and a movable support member 346 connected to the ends of pistons (not shown) of the lift actuators 344. Each movable support member 346 is bolted to the top of pistons of a pair of lift actuators 344 and may be lifted or lowered when both pistons of cylinders 32 are simultaneously extended or retracted. The back pressure assembly 305 is supported on the movable support members 346 of the lifting assembly 322. The simultaneous action of both mold lifting assemblies 322 provides for lifting or lowering of the back pressure assembly 305 and mold 303 connected thereto. Two locating pins 348 connected to each vertical frame member 14 are aligned with and advanced into two locating holes 349 formed in a base 350 of the back pressure assembly 305 when the back pressure assembly 305 is lifted to advance the mold 303 into engagement with the nozzle 313 of the plasticizing vessel 310. Insertion of the locating pins 348 into the locating holes 349 provides precise positioning and alignment of the mold 303 with respect to the plasticizing vessel 310. When the pressure assembly 305 with attached mold 303 are lifted by hydraulic assemblies 322, the locating pins 348 are inserted into the holes 349 and with further lifting of pressure assembly 305 with mold 303, the engagement of mold 303 with the nozzle 313 of plasticizing vessel 310 will be accomplished. The capacity of the relatively small lifting actuators 344 is chosen to hold the weight of the mold 303 and back pressure assembly 305 and to provide the necessary clamping force to prevent disengagement of the mold 303 from the plasticizing vessel 310 during injection. Four small 5 ton hydraulic cylinders will be adequate for most applications.

Figure 18:
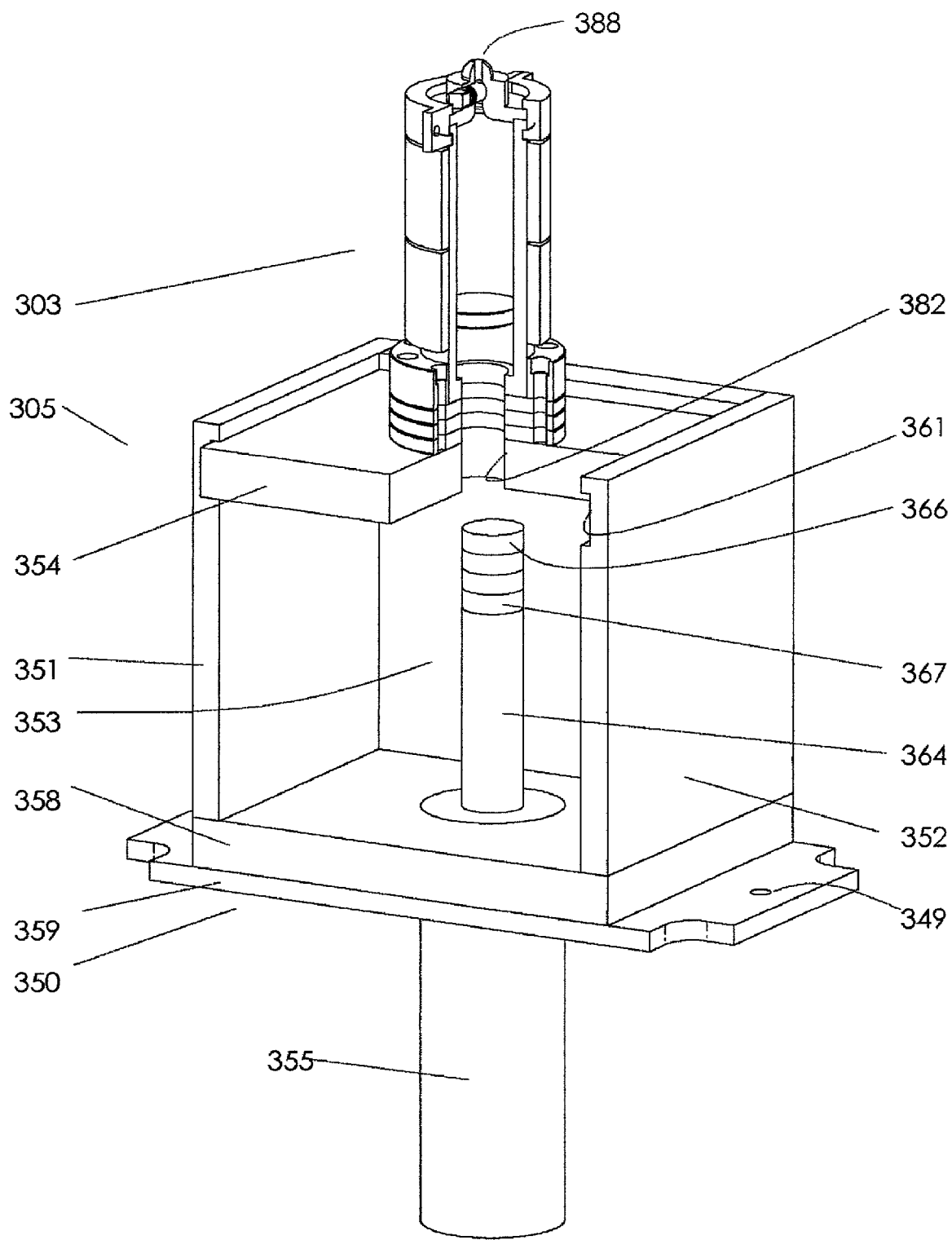
FIG. 18 is a further enlarged, perspective view of the mold and back pressure assembly with portions removed to show detail.

Back Pressure Assembly and Mold. The mold 303 and back pressure assembly 305 are best shown in FIG. 18, in which portions have been removed to show interior detail thereof. The mold 303 and back pressure assembly may collectively be referred to as a mold unit. The back pressure assembly includes base 350, sidewalls 351 and 352, rear wall 353, mold mounting plate 354 and back pressure actuator 355. The base 350 shown is formed from two plates 358 and 359 that are bolted together. The lower plate 359 being wider and having the locating holes 349 formed in portions thereof extending beyond the top plate 358. Sidewalls 351 and 352 and rear wall 353 have horizontal grooves 361 formed on their inner surfaces just below their upper edges for receiving the edges of the mold mounting plate 354 for securing the mold mounting plate 354 thereto. Sliding the mold mounting plate 354 and with a mold 303 attached thereto is a convenient way of changing the mold 303 when necessary.

The back pressure actuator 355 shown comprises a hydraulic actuator mounted to the base 350 of the back pressure assembly. Similar to the injection actuator 320, the back pressure actuator 355 contains a piston extension 353 extending up through the base 350. The piston extension assembly 353 is mounted on the end of the piston (not shown) of the actuator 355 by bolting or the like and comprises an upper or outer disk 366 with a plurality (three shown) of insulating disks 367 interposed between the upper disk 366 and the end of the round metal sleeve 364. The outer disk 366 is preferably formed of metal and is thermally insulated from sleeve 364 by the insulating pads or disks 367 to protect the actuator 355 from overheating. Silicon bonded mica disks of 1 inch thickness may be used for such thermal insulation.

Figure 19:
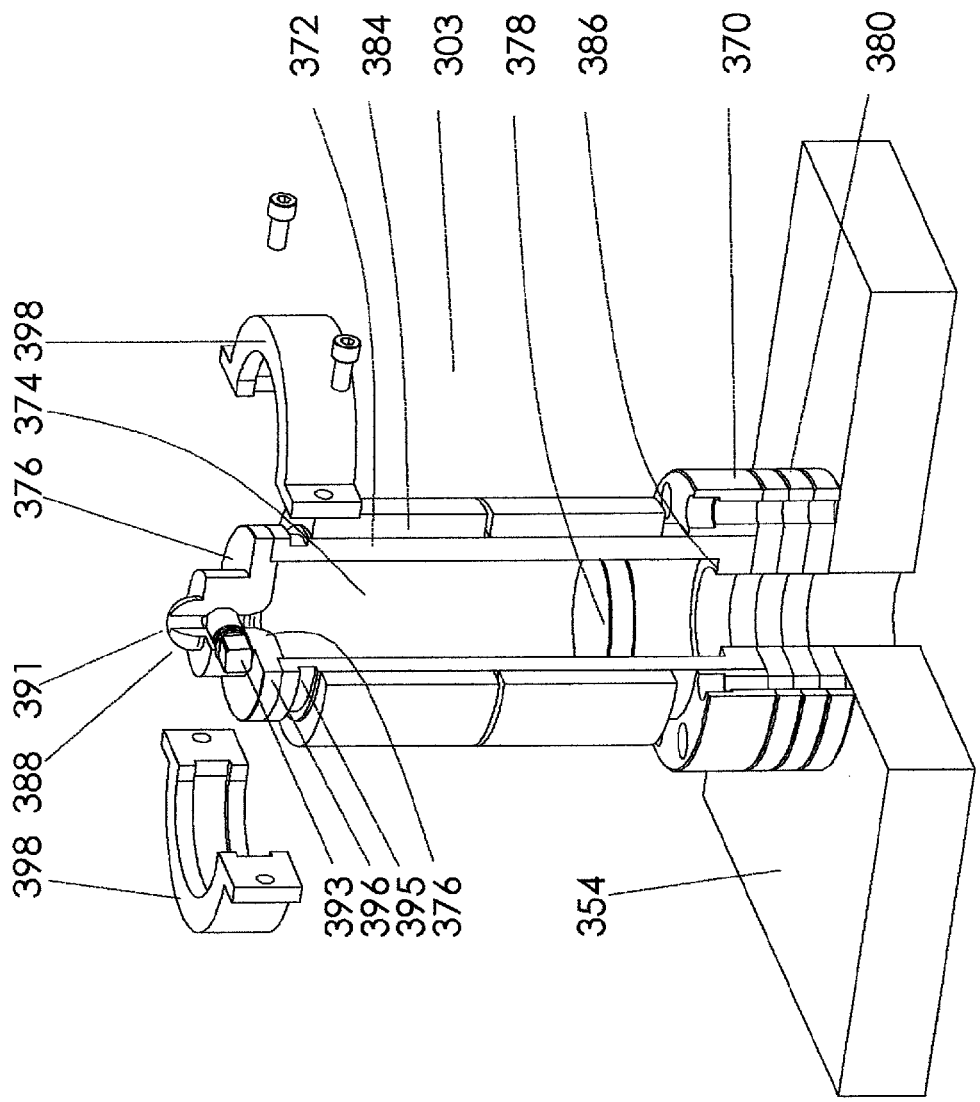
FIG. 19 is an exploded, perspective view of the mold with portions removed to show detail.

Mold 303 is best seen in FIG. 19 in which portions have been removed to show interior detail thereof. The mold 303 is mounted to the mold mounting plate 354 by bolts (not shown). Plate 354 is generally replaced with the replacement of the mold 303 for facilitating rapid transition to a new mold for molding parts of different shapes or dimensions. For illustrative purposes, the mold 303 in FIG. 19 is shaped for molding cylindrical parts exceeding several inches in diameter. It is to be understood that the mold 303 may be designed or shaped to mold parts of various shapes and dimensions.

The mold 303 includes a base mounting flange 370, a mold sidewall or sleeve 372 defining a variable volume mold cavity 374, an inlet end wall 376 and a moveable mold member, wall or plunger 378 slidably mounted within the mold cavity 374 to vary the volume of the mold cavity 374. The base mounting flange 370, which is preferably formed from a hardened metal or alloy is threadably connected to a lower end of the mold sidewall 372 and then bolted to the mold mounting plate 354 by bolts (not shown) with several layers of annular insulating disks 380 interposed therebetween to thermally separate the mold sidewall 372 and mounting flange 370 from the mold mounting plate 354. Insulation of the mold sidewall 372 from the mold mounting plate 354 permits increased efficiency in preheating and cooling of the mold 303 during molding cycles. Silicon bonded mica plates or glass-mica plates may be used as a material for the insulating disks 380. Silicon bonded mica can withstand temperatures up to 1292° F., compression pressure of up to 17,000 psi and has very low thermal conductivity.

The base mounting flange 370, the mold sleeve 372 and the insulating disks 380 are annular, having central openings extending therethrough in alignment with a hole 382 in the mold mounting plate 354 through which the piston extension 365 of the back pressure actuator 355 extends for engagement with the mold plunger 378. The mounting flange 370 may contain an external band heater or internal cartridge heaters (not shown) to control its temperature during all the stages of operation. These heaters may be used for preheating the flange 370 as well as lower portion of the mold sleeve 372 by conduction during the heating cycle. These heaters may also be used to control the uniformity and rate of cooling of the mold components during a cooling cycle.

In the embodiment shown in FIG. 19, the mold sidewall 372 is generally formed as a hollow metal cylinder or sleeve with an internal bore or chamber, and is surrounded by a band heater 384 such as can be purchased from Plastic Process Equipment Incorporated which generally comprises a heating coil surrounded by a layer of ceramic material with an outer insulating layer all housed in a metal enclosure. A thermocouple (not shown) may be connected to the mold sidewall 372 through the hole (not shown) in the band heater 384 to control the temperature through an external controller (not shown). An inwardly projecting lip or shoulder 386 is formed on an inner surface of the sleeve 372 at or near its lower or distal end to create a stop to prevent the mold plunger 378 from sliding past the shoulder 386.

The inlet end wall 376 shown is formed from metal and includes a hemi-spherical projection 388 formed on an upper surface thereof for insertion in a matingly shaped hemispherical depression 389 on the plasticizing vessel nozzle 313. A inlet passageway 391 extends through the inlet end wall 376 including through the hemi-spherical projection 388 and in communication with the mold cavity 374. Molten plastic from the plasticizing vessel 310 may be injected through the inlet passageway 391 and into the mold cavity 374. A valve 393 is mounted in the inlet end wall 376 of the mold 303 and is selectively operable for closing the inlet passageway 391 to control the flow of molten plastic into the mold cavity 374.

A circumferential groove 395 is formed in the outer surface of the sleeve 372 near its upper or inlet end to form an outwardly projecting flange or upper flange 396 extending thereabove. The inlet end wall 376 is supported on and generally closes off the upper end of the mold sidewall 372. An annular recess 397 may be formed in a bottom surface of the inlet end wall 376 to receive the upper end of the sleeve 372 and ensure proper alignment of the inlet end wall 376 with the sleeve 372. Two semi-annular clamping blocks or clamps 398 may be slid into engagement with the upper flange 396 on the sleeve 372 and the top surface of inlet end wall 376 to secure the inlet end wall 376 to the sleeve 372.

The mold 303 is preferably preheated by the band heater 384 prior to injection of molten plastic therein. During preheating of the mold 303, the piston 364 of the back pressure actuator 355 is fully retracted allowing engagement or abutment of the mold plunger 378 with the inwardly projecting lip 386 on the inner surface of the mold sleeve 376 to prevent the mold plunger 378 from dropping past the lip 386 and the bottom edge of the mold sidewall 372. With the mold plunger 378 positioned against the lip 386, the mold 303 may be described as being in its fully opened state, maximizing the volume of the mold cavity 374.

When the back pressure actuator 355 is fully extended, the mold plunger 378 preferably extends in closely spaced relation to the inlet end wall 376 to minimize the volume of the mold cavity 374. It is preferable to leave a slight gap between the mold plunger 378 and the inner surface of the inlet end wall 376 to provide sufficient surface area across the mold plunger 378 upon which the molten plastic may act to overcome the back pressure exerted by the back pressure actuator 355. The gap may be formed by restricting upward movement of the hydraulic piston 364. It may also be formed by a variety of means including an inwardly projecting lip on the inner surface of the inlet end wall 376 or an upwardly projecting circumferential lip on the mold plunger 378.

Figure 20:
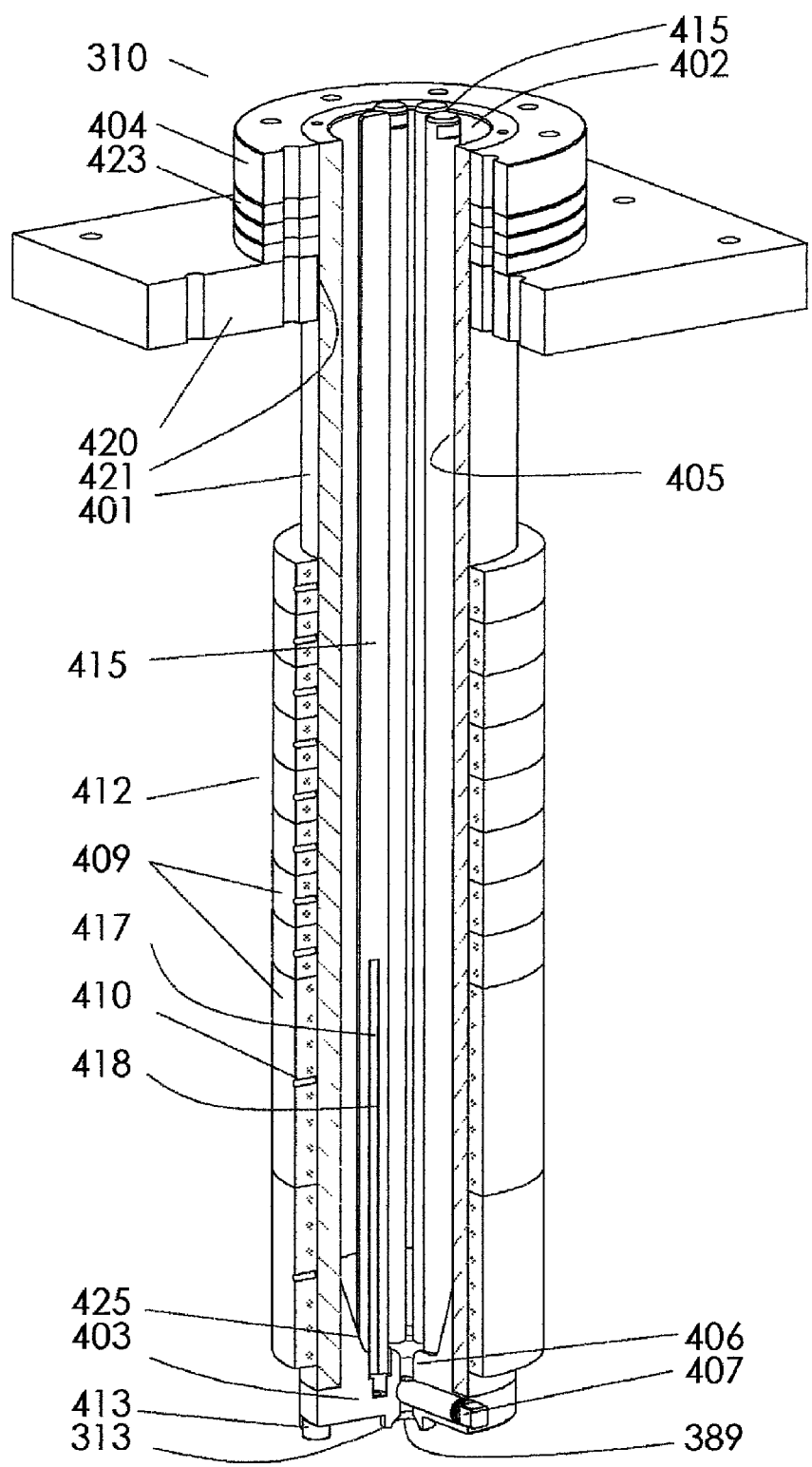
FIG. 20 is an enlarged perspective view of the plasticizing vessel of the alternative embodiment with portions removed to show detail.
Figure 22:
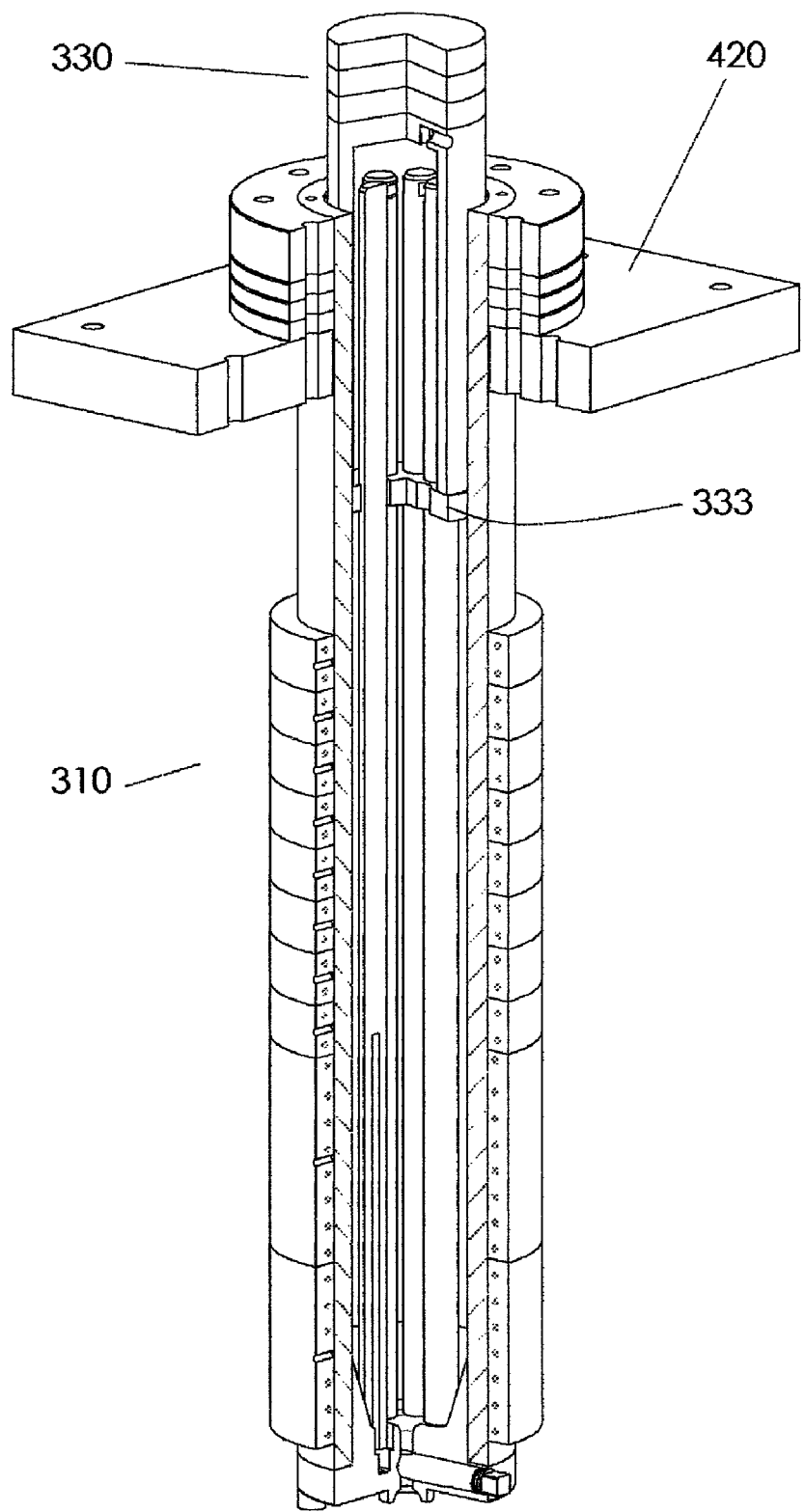
FIG. 22 is a an enlarged and exploded perspective view of the plasticizing vessel of the alternative embodiment with the injection plunger inserted in a cavity of the plasticizing vessel and with portions removed to show interior detail.

Plasticizing Vessel. The plasticizing vessel 310, as best seen in FIGS. 20-22, is adapted to receive pellets of plastic or polymer work material and heat the pellets to injection temperature in three stages of preheating. The injection temperature is the temperature at which the polymer work material has a viscosity suitable for injection (or displacement) into the mold, or in other words the temperature at which the plastic may be injected into the displacement-injection mold 303.

Referring to FIGS. 20-22, the plasticizing vessel 310 comprises a cylindrical wall, barrel or metal sleeve 401 with an open top or inlet 402 a stationary end wall or outlet end wall 403 extending across an outlet end of the barrel 401, the nozzle 313 formed on the outlet end wall 403 and a mounting flange 404 mounted on the barrel 401 at an upper end thereof. Barrel 401 and the end wall 403 define a plasticizing vessel cavity 405 into which the plastic granules are received, compacted, and heated to their injection temperature. A discharge passageway 406 is formed in the outlet end wall 403 opening into and extending from the cavity 405 and through the nozzle 313. The outer or distal end of the nozzle is shaped to mate with the projection 388 on the mold 303, and in the embodiment shown is formed as a hemi-spherical recess or depression 389 as discussed above. A flow control valve 407 extends through the end wall 403 of the barrel 401 and into the discharge passageway 406 for use in controlling the flow of molten plastic out of the plasticizing vessel 310. By rotating the valve 407 ninety degrees in either direction, the outlet passageway 406 way may be opened or closed. The barrel 401 preferably is made of a hardened metal or alloy to withstand high pressures and temperatures. High-speed tool steel may be employed as the material for the barrel 401 and the displacement-injection mold members.

The barrel 401 is surrounded on its outer surface by electrical band heaters 409 generally of the same type used for the mold 303 such as ceramic band heaters sold by Plastic Process Equipment, Inc. These band heaters have built-in ceramic thermal insulation which significantly reduces heat radiation. Band heaters 409 also contain small holes 410 for the attachment of the thermocouples (not shown) to the barrel 401 to control its temperature in different zones during the heating cycle. The barrel 401 and the band heaters 409 may be collectively referred to as the plasticizing vessel sidewall or circumferential sidewall 412.

A plurality of heat transfer members, heating elements or cores 415, five of which are incorporated into the embodiment shown in FIGS. 20-22 (only four are shown), are threadingly connected to the bottom end wall 403 and extend upward therefrom and generally slightly above the top of the barrel 401. The cores 415 generally extend in parallel alignment with an axis of the plasticizing vessel cavity 406. The cores 415 function to deliver heat directly to the central region of the plasticizing vessel cavity 405 to reduce the distance of heat flow and, hence, reduce the heating time. The significant effect of the heating cores 415 on the heat transfer process and reduction of heating time is analyzed above in the present description. The cores 415 are preferably formed from hardened metal or alloy and are heated by electric cartridge heaters 417 inserted in bores 418 formed in the lower end of the cores 415. The cartridge heaters 417 preferably contain built-in thermocouples (not shown) for electronic control of their temperatures. Trough holes and grooves (not shown) in the lower end wall 403 may be used for electrical wiring of the cartridge heaters 417 and thermocouples. It is foreseen that the cores or heat transfer members 415 could function to transfer heat without the connection of heating elements or cartridge heaters 417 directly thereto, but instead simply serve as a conduit for transferring heat generated by heaters mounted on interconnected portions of the plasticizing vessel 310.

Referring again to FIG. 16, the plasticizing vessel 310 is secured to the lower bolster 318 through metal plate 420 either by bolts (not shown) or by welding. More specifically, an upper end of the plasticizing vessel barrel 401 extends through a hole 421 in plate 420. Flange 404, which is larger in diameter than the hole 421 in plate 420, is connected to the inlet end of the barrel 401 by threading or other suitable means. Annular insulating disks 423 are positioned around the barrel 401 between the flange 404 and an upper surface of the plate 420 to aid in insulating the lower horizontal bolster 318 from the hot barrel 401. The plasticizing vessel 310 is connected to the plate 420 by bolts (not shown) extending through holes in the flange 404, insulating disks 423 and plate 420. The plasticizing vessel 310 is mounted below the injection actuator 320 in axial alignment with the injection actuator 320 and the piston extension 330 connected thereto.

Referring to FIGS. 21-22, the piston extension 330 is advanceable into and out of the plasticizing vessel cavity 405 by the injection actuator 320. The holes 337 formed in the injection plunger 333 on the piston extension 330 correspond in number to and are sized and spaced to slide over the cores 415 to form a relatively snug fit around the cores 415 to prevent molten plastic from flowing between the cores 415 and the holes in the plunger 333. The outlet end wall 403, which is bolted to the barrel 401 by bolts 413, has a snug fit with the barrel 401 with a clearance of about 0.00025 inches to prevent molten plastic from leaking therebetween. In contrast, injection plunger 333 has a relatively large clearance relative to the inside diameter of the barrel 401 of about 0.020 inch or more, which permits the plunger 333 to slide freely along the inner surface of the barrel 401. Because the plastic material positioned just below the plunger has a temperature which is near the heat deflection temperature $T_{defl}$, it generally forms a resilient plug when compressed by the injection plunger 333 and prevents molten plastic from below from leaking up past the plunger 333. The outlet end wall 403 may be removed from the barrel 401 through the lower end for maintenance and the like by unscrewing bolts 413. The upper inner surface of the outlet end wall 403 has a conical surface 425 to allow smooth transition of melt flow from the larger cross-sectional area of the tube to the relatively small cross-section of the outlet passageway 406. Failure to provide such a smooth transition will result in trapping of the molten plastic or melt in the bottom portion of the vessel with areas having restricted melt flow. This will cause aging and degrading of trapped melt and, as a result, poor quality or rejection of molded parts.

In the embodiment shown in FIG. 16, the mold 303 is brought into flow communication with the plasticizing vessel 310 by lifting of the mold 303 using the hydraulic lift actuators 344. Upon mating engagement of the hemispherical projection 388 on mold 303 with the hemispherical depression 389 on plasticizing vessel nozzle 313, valves 407 and 393 are opened and a portion of the contents of the plasticizing vessel cavity 405 can be injected into the mold 303 by advancement of the injection plunger 333 toward the plasticizing vessel outlet end wall 403

Multizone concept of plasticizing vessel. In contrast to the batch plasticizing vessel 14 discussed previously, plasticizing vessel 310 incorporates a plurality of temperature zones for heating the contents to increasingly higher temperatures the closer the material is positioned near the end wall 403. Instead of uniform heating of the entire volume of the plasticizing vessel 14 to the injection temperature, plasticizing vessel 310 incorporates at least two and preferably three or more zones heated to different temperatures. In the preferred embodiment of the present invention, the vessel 310 or cavity 405 may be subdivided into three zones with a top zone for adding fresh pellets and their compaction, a middle zone for preheating the pellets to intermediate temperatures, and a bottom zone adjacent to the end wall 403 for uniform heating of plastic material in this zone to the injection temperature. The amount of material in each zone is approximately equal to or slightly greater than the amount of material needed to form a plastic part in the associated mold 303 which may be referred to as a shot size. The density of compacted plastic material in the bottom zone is maximal and equal to the density of fully compacted polymer material at a given injection temperature. Correspondingly, by the end of heating cycle the temperature of the bottom zone is uniformly distributed through its volume and equal to its injection temperature $T_{inj}$.

Moving toward the top portion of the plasticizing vessel 310, the temperature of compacted pellets gradually reduces and in the very top region adjacent to injection plunger 333, the temperature is near the heat deflection temperature $T_{defl}$. In the top zone, the plastic pellets are compacted only partially. For this reason the bottom zone has the lowest volume compared to the middle and top zones. The volumes of these zones are related approximately in the proportion 0.25:0.33: 0.42, from the bottom zone to the top zone, while the amount of polymer material in each zone remains the same and equal to the shot size. Accordingly, the three-zone vessel contains three shot sizes of polymer material. Even though the very top layers of pellets in the top zone are not fully compacted to the same density of the material in the bottom zone, the plastic pellets are compacted sufficiently to block the access of atmospheric air to the plastic material therebelow, including plastic material in the middle and bottom zones, where the temperatures are higher and oxidation is more likely to occur. Drawing the air by vacuuming the plasticizing vessel cavity 405 prior and during compaction will benefit to the quality of the compact and the melt since it prevents trapping the air in the melt.

The temperature or temperature profile in each zone is controlled by the external band heaters 409 and the internal cartridge heaters 417. The number and the width of external heaters 409 as well as their temperature settings in each zone may be chosen depending on the desired temperature distribution along the vessel 310. Similarly, the desired temperature profile along internal cores 415 is provided by the cartridge heaters 417, which may have multiple heating elements with different power ratings to control the core temperature in different zones of the vessel 310. It is desired that temperature profiles along the barrel 401 and the cores 415 be as close as possible in order to obtain a uniform temperature through the plastic material in a radial (transverse) direction. This is a preferred operating condition for obtaining melt of uniform temperature in the bottom zone of the vessel cavity 405.

In a variation of the continuous heating plasticizing vessel 310 as described above, the cartridge heaters 417 of each core 415 contain a single heating element with the length approximately equal to the length of the bottom zone. In this arrangement, the portion of the core 415 in the bottom zone is controllably heated and maintained at the injection temperature $T_{inj}$. Heat is delivered to the middle and top portions of cores 415 by thermal conduction due to the high thermal conductivity of the metal forming the cores 415. The temperature of the cores gradually drops from $T_{inj}$ in the bottom zone toward the top and does not significantly exceed $T_{defl}$ through the top zone. The temperatures of all external and internal electrical vessels' heaters 409 and 417 are controlled by PLC or other electronic means, for example, DME multi-zone temperature controllers. The injection plunger 333 does not require a heating element since it is intended to maintain the top portion of compacted pellets at a lower temperature relative to the rest of the compacted plastic pellets extending therebelow. The injection plunger 333 will typically remove heat by conduction from the compacted pellets and the sides of the barrel 401 and from cores 415. The heat accumulated by injection plunger 333 is conducted to the hydraulic piston extension 330 and is radiated to atmosphere. The resulting equilibrium temperature in the very top portion of the vessel is preferably at or near the heat deflection temperature $T_{defl}$.

Molding Process: The molding process using the continuous heating plasticizing vessel 310 has many similarities to the molding process described above using the batch plasticizing vessel 14. The pellets or granules of the work material used in the plasticizing vessel 310 are preferably preheated prior to placement in the plasticizing vessel 310 by conventional heating means such as the convection oven 200 shown diagrammatically in FIG. 8. The polymer material is preheated to a temperature near or preferably slightly above the heat deflection temperature, which corresponds to the temperature at which the plastic generally becomes pliable but not yet a liquid. The preheated and dried plastic material is then transferred to and poured into the plasticizing vessel cavity 405 in a manner as discussed above for the batch system.

Prior to placing the initial load of plastic granules in the plasticizing vessel cavity 405, the entire plasticizing vessel 310 is preferably preheated at least to the heat deflection temperature and typically to the intended operating temperature for each zone. Doing so prevents the temperature of the granules from dropping below the heat deflection temperature upon placement in the plasticizing vessel cavity 405. While the plasticizing vessel 310 is being preheated, the portions of the mold 303 forming the mold cavity 374 are also preferably preheated to the injection temperature of the melt. Before the pouring of plastic granules into the plasticizing vessel 310, valve 407 is closed. Valve 393 in the mold 303 is also preferably closed during preheating.

After preheating of the plasticizing vessel 310 and the mold 303 and the pellets to be fed into the plasticizing vessel 310, the piston extension 330 is advanced to a fully retracted position out of the cavity 405 and a first selected quantity of preheated plastic pellets, granules or powder is transferred from the preheating assembly and poured into the plasticizing vessel cavity 405. The injection actuator is activated to advance the piston extension 330 into the cavity 405 to compact the pellets therein through the action of plunger 333 on the pellets. The piston extension 330 is then withdrawn from the cavity, and additional quantities of plastic granules are successively poured into cavity 405 and compacted by the plunger 333 until the cavity 405 has been filled with an amount of material equal to the desired number of shot sizes, which in the preferred embodiment is three. As mentioned previously it is preferable to remove air from the cavity 405 by suction through vacuum port 339 prior and during compaction and later during heating of pellets.

Once the desired quantity of plastic granules is loaded into the vessel cavity 405 and compacted, the plunger 333 is held in the extended position maintaining pressure against the plastic granules. The plastic granules in each zone of the cavity 405 are allowed to heat until the granules in the bottom zone reach the injection temperature, $T_{inj}$. The lift actuators 344 are simultaneously actuated to lift mold 303 and back pressure assembly 305 into engagement with the plasticizing vessel's nozzle 313. When the mold 303 is lifted up, the locating pins 348 first come into engagement with the locating holes 349 in the back pressure assembly base 350 and position the mold 303 in alignment with the nozzle 313 of plasticizing vessel 310.

Upon engagement of the mold 303 with plasticizing vessel 310, the back pressure actuator 355 is actuated to extend the back pressure piston 364 and extension assembly 365 until the extension assembly 365 abuts against the mold plunger 378 driving plunger 378 upward and into engagement with or in closely spaced relation to the mold inlet end wall 376. As the mold plunger 378 advances upward, air contained in the mold cavity 374 escapes or is vented through vent holes (not shown) located at the interfaces of the inlet end wall 376 and mold plunger 378 with the mold sidewall 372. The back pressure exerted on the mold plunger 378 by the piston 364 is generally maintained constant during the injection and cooling stages.

The valve 393 in the mold inlet end wall 376 is opened by turning it 90° in either direction to open the inlet passageway 391 in the inlet end wall 376. Similarly, the valve 407 of plasticizing vessel 310 is opened by turning it 90° in either direction. The hydraulic actuator 20 of the press assembly 312 is actuated and its piston with attached piston head 330 and plunger 333 connected thereto are extended to drive the plunger 333 toward the stationary end wall 403 of the plasticizing vessel 310. The pressure developed by cylinder 320 through compacted pellets of the top and middle zones is applied to the melt in the bottom zone forcing the molten work material out of the plasticizing vessel cavity 405 through the nozzle 313 and opened valve 407, through the mold nozzle 393 and into the closed mold cavity 405 as represented schematically at 215 in FIG. 8.

Forward pressure on the injection plunger 333 exceeds the back pressure on the mold plunger 378 allowing the melt to flow in the direction to the mold cavity 405. As the molten work material is forced into the mold cavity 405 under pressure, the work material drives the movable mold plunger 378 rearward against the back pressure exerted thereon by the back pressure actuator 355. To prevent damage to the back pressure actuator 355, a relief valve (not shown) should be connected to the hydraulic fluid supply lines for the back pressure linear actuator 355.

When the mold plunger 378 reaches its fully retracted position abutting against base flange 396, the melt displacement is accomplished. Full displacement or filling of the mold may be detected by a sudden increase in forward pressure. At this moment the valves 393 and 407 for the plasticizing vessel 310 and the mold 303 respectively are closed by turning them 90° in either direction to close their associated passage ways.

To prepare the mold 303 for cooling after closing the valve 393, first the portable cart 307 is moved in under the mold 303 and back pressure assembly 305. The lift actuators 344 are simultaneously retracted to lower the mold 303 and back pressure assembly 305 onto the top of the portable cart 307. The cart 307 is then removed to a location where the mold 303 can cool. Another mold unit including another mold 303 and back pressure assembly 305 located on another portable cart 307 may then be moved into position beneath the plasticizing vessel nozzle 313 to prepare for the next shot.

During the cooling of mold 303 in cooling station 304, back pressure is continuously applied to the mold plunger 378 and the plastic injected into the mold cavity 374 by the back pressure actuator 355 until the plastic material in the mold cavity 374 is completely solidified. The required back pressure is specific for each particular work material and should be determined by trials.

To open the mold 303, the back pressure applied against the mold plunger 378 is released and then mold clamps 398 are removed from the mold 303 allowing separation of the mold inlet end wall 376. Back pressure actuator 355 is actuated again to extend the piston 364 with piston extension 365 until the molded part is completely removed and separated from the mold 303. It should be noted, that all these operations of removing the mold 303 from injection station 301, its replacement with another mold 303 and operations related to opening the mold 303 and removing molded parts of previous shots, all may be conducted during a subsequent heating cycle of the plasticizing vessel 310.

After a new mold 303 and back pressure assembly 305 are positioned under the plasticizing vessel 310, the process is repeated. After removing the previous mold 303, the piston of the injection actuator 320 is fully retracted to permit adding of fresh granules into the cavity 405 of the vessel 310. In every cycle after the initial cycle, the amount of fresh pellets added will correspond to the previous shot size and generally is only added to the top zone of the plasticizing vessel cavity 405.

Optimal settings for all internal and external heaters of the vessel 310 are chosen by trial for each particular work material and to provide the desired temperature pattern along the vessel 310 as described above. The established temperature pattern remains relatively steady during the continuous mode of operation of the plasticizing vessel 310. Some variations of temperature pattern may be observed after each shot and adding of fresh pellets, but after a short period of heating time the temperature pattern along the vessel 310 will be reestablished and return to normal state determined by settings on a PLC or other electronic means of control.

Since pellets prior to compaction are preheated to approximately heat deflection temperature $T_{defl}$, the plasticizing vessel is required to rise the temperature from $T_{defl}$ in the very top portion of the vessel's cavity to injection temperature $T_{inj}$ in the bottom vessel's zone. Total temperature rise $(T_{inj}-T_{defl})$ is accomplished during three consecutive heating stages in three temperature zones. The pellet's temperature rises continuously while they are displaced from top zone to the middle zone, and finally to the bottom zone. The use of the continuous heating plasticizing vessel 310 allows significantly reduced process cycle times. For example, the total required temperature rise from the deflection temperature to the injection temperature $(T_{inj}-T_{defl})$ for PEEK 30% CF is about 220° F. and the process cycle time between two consecutive shots may be reduced to 20 minutes or less. In preparation for the next shot, the next mold 303 is preheated to the temperature approaching closely to the injection temperature $T_{inj}$. The necessary quantity of mold units to provide an uninterrupted continuous mode of operation for the plasticizing vessel 310 may be estimated from the ratio of the cooling time to heating cycle time. For example, for molding solid round parts 4" in diameter and 6" long made of PEEK 30% CF, the heating cycle for the plasticizing vessel 310 is about 20 minutes. Adding the time for changing out the molds 303 and back pressure assemblies 305, the injection process time may be about 30 minutes. Cooling time of the same parts in the mold 303 is approximately 3 hours. The minimal quantity of molds 303 and back pressure assemblies 305 for continuous non-interrupted operation of the plasticizing vessel is therefore equal to six. These six units may be identical or different and their mold capacity may affect the process time making it shorter or longer depending on shot size.

The differential pressure between the forward pressure exerted by the injection plunger 333 and the back pressure exerted by the mold plunger 378 is determined by trial and will vary depending on various factors including the materials utilized and injection temperatures. Provided below in Table 2 are examples of differential back pressures for molding parts using the displacement injection molding process disclosed herein:

TABLE 2

| Material | Injection temperature °F. | Pressure under the top plunger, kpsi | Pressure under movable mold plunger, kpsi | Pressure differential, kpsi |
|---|---|---|---|---|
| Torlon | 630 | 9.7 | 1.7 | 8 |
| Torlon | 645 | 10.3 | 2.6 | 7.7 |
| PEEK unfilled | 730 | 11.3 | 2.1 | 9.2 |
| PEEK unfilled | 740 | 9.5 | 1.7 | 7.8 |
| PEEK 30% CF | 740 | 4.8 | 2.2 | 2.6 |
| PEEK 50% CF | 725 | 8 | 3 | 5 |
| PEEK 50% CF | 740 | 5.5 | 1.7 | 3.8 |
| PEEK 50% CF | 750 | 5.4 | 1.7 | 3.7 |
| PEEK 50% CF | 755 | 7.1 | 3.5 | 3.6 |
| PEEK 50% CF | 760 | 5.1 | 1.9 | 3.2 |
| PEEK 50% CF | 770 | 4.5 | 2.8 | 2.8 |

These experimental data were obtained using a PE552 hydraulic pump made by SPX Power Team with a known pumping performance chart: oil volume (cu. in./min) versus pressure (psi). The maximum injection rate provided by such pump at full pressure of 10,000 psi is 55 cubic inches per minute. The relatively high value of the pressure differential shown in Table 2 is due in part to the relatively high injection rate of the viscous melt through the small diameter passageways (½ inch) 406 and 391. The dimensions of the plasticizing vessel utilized are as described below. As seen in Table 2, increases in temperature for the same material reduces the viscosity of the melt reducing the amount of pressure required to force the melt through the passageways 406 and 391 and reducing the amount Effect of Cores in Continuous Heating Plasticizing Vessel: A plasticizing vessel 310 with an internal diameter of the barrel 401 equal to 4 inches contained three equally spaced cores 415 having a diameter of 1 inch and which were symmetrically located relative to the barrel 401. The plasticizing vessel 310 with three cores 415 was constructed in the manner discussed above and as generally shown in FIGS. 20-22. The volume reduction of the plasticizing vessel cavity 405 due to the three cores 415 was 18%. The percentage of the total cavity volume available to receive polymer work material, or in other words, the portion not occupied by cores, consequently was equal to 82%. The length of the barrel 401 was 18 inches and the bottom zone length was approximately 5 inches, which corresponds to 51 cubic inches of the shot size. Solid rods and thick wall tubes of diameter 4 inches were molded from different high performance engineered thermoplastics including Ketron and Torlon. The heating time for the three cores design was reduced to twenty minutes and provides operation of the vessel in continuous mode without interruption of heating cycle. Thick-walled molded parts made by the use of the continuous heating displacement-injection molding system also exhibited improved mechanical properties due to significantly improved flow pattern of the melt. The flow pattern of molded round parts is characterized by axial symmetry and relatively uniform and repeatable molecular orientation.

A batch plasticizing vessel, similar in design to plasticizing vessel 14 was created with a single core which occupied approximately 8% of the volume of the plasticizing vessel leaving approximately 92% of the cavity available to receive granules of polymer material for heating and ejecting. The percentage of the total cavity volume available to receive polymer work material, or in other words the portion not occupied by cores, in either a batch type plasticizing vessel, such as vessel 14 or a multi-zone plasticizing vessel, such as vessel 310 preferably is at least fifty percent. It is believed that the optimal percentage of the total cavity volume available to receive polymer work material while providing adequately rapid heating of the polymer material to its injection temperature is approximately seventy to ninety percent (30% to 10% occupied by cores) with a percentage of at least seventy percent or even percentages of at least eighty percent (20% of volume occupied by cores) or eighty five percent (15% of volume occupied by cores) being preferred. In contrast to DIM plasticizing vessels as discussed herein, plasticizing vessels of conventional injection machines typically have less then 50% of the barrel cavity available for receiving polymer material. This is because the reciprocating screw (or torpedo for plunger type vessels) occupies a significant portion of the barrel's volume. Since both DIM and conventional plasticizing vessels preferably contain the amount of plastic material for two or three shots, the conventional plasticizing vessels with less than fifty percent of the total volume available to receive plastic material, must be much longer. The ratio of the length L to the diameter D of the barrel (L/D) for conventional injection machines may exceed 20:1, while for the multi-zone plasticizing vessel described above wherein the cores occupy 18% of the total volume, the ratio is approximately 4.5:1.

It is to be understood that while certain forms of the present invention have been illustrated and described herein, it is not to be limited to the specific forms, process steps or arrangement of parts described and shown and that the invention should be limited only by the claims. It is to be understood for example that the injection system could be utilized without a cooling station and the mold can cool down in the injection station. Such a simplified system nevertheless will have a prolonged process time.

It is also foreseen that the heating cores such as cores 415 can take a wide variety of shapes and geometries. Similarly, the cross-section of the circumferential sidewall 372 of the mold 303 and barrel 401 of the plasticizing vessel 310 may take a wide variety of shapes including rectangular, triangular or ovate or other more complicated geometries. The term circumferential is not intended to be limited to circular shapes but intended to include other geometries as indicated above. Although the molding process of the present invention is particularly well adapted for molding parts of stock shapes and uniform cross-section, it is to be understood that the process could be utilized to mold parts of more complicated shapes. To mold parts of more complex shapes, multiple mold plungers could be utilized which would then stop at different positions within the mold cavity.

Although the mold sidewall 372 and inlet end wall 376 are described as being stationary with the mold plunger 378 moving relative to the sidewall 372 and end wall 376, it is foreseen that plunger 378 could be maintained stationery with the sidewall 372 and the end wall 376 moving relative to the plunger 378 to vary the volume of the mold cavity. In addition, it is foreseen that the plasticizing vessel utilizing core heating elements could be used without the variable volume mold and back pressure assembly, such as conventional injection molds. Similarly, the variable volume mold utilizing back pressure to avoid the formation of voids or pores could be used with different plasticizing vessels. Although the ejection mechanism shown and described herein is a plunger type mechanism it is to be understood that the term ejection mechanism is not intended to be limited to plunger type mechanisms and may include mechanisms such as screws or other functionally equivalent mechanisms, particularly when the variable volume mold assembly utilizing back pressure as disclosed herein is used with a plasticizing vessel other than that of the type disclosed herein.

It is also to be understood that although the end walls of the plasticizing vessel 310 and the mold 303 could be of a variety of configurations including conical, hemi-spherical or other geometries that generally extend across and close the circumferential sidewall.

What is claimed is:

1. A process for molding a thick walled part from a thermoplastic polymer comprising the steps of:
a) providing a plasticizing vessel;
b) providing a mold having a stationary mold member and a moveable mold member cooperatively forming a mold cavity; the moveable mold member moveable relative to the stationary mold member to vary the volume of the mold cavity for forming a relatively thick walled molded part; and connecting said mold to said plasticizing vessel;
c) filling at least a portion of said plasticizing vessel with granules of a selected thermoplastic polymer;
d) heating at least a portion of the granules in the plasticizing vessel to an injection temperature of the selected thermoplastic polymer;
e) heating portions of said mold forming said mold cavity to a temperature approximately equal to the injection temperature of the selected thermoplastic polymer prior to injection of said selected thermoplastic polymer therein;
f) displacing at least a portion of the selected thermoplastic polymer heated to the injection temperature out of the plasticizing vessel and against the moveable mold member under a forwardly directed pressure while simultaneously applying back pressure to the moveable mold member to resist expansion of the volume of the mold cavity, wherein the forwardly directed pressure of the displaced portion of the selected thermoplastic polymer acting against the movable mold member exceeds the back pressure by an amount sufficient to cause the moveable mold member to move against the back pressure and the volume of the mold cavity to expand in direct proportion to the amount of the selected thermoplastic polymer displaced into the mold cavity; and wherein said back pressure exerted by said movable mold member is sufficient to remove or prevent formation of substantially any air voids and pores in said selected thermoplastic polymer injected into the mold cavity created by the internal gas pressure of said selected thermoplastic polymer;
g) separating the mold from the plasticizing vessel;
h) using a control system to control at least one mold heater to selectively heat the stationary mold member and the moveable mold member to provide equal cooling rates for the stationary and moveable mold members to provide uniform cooling at a desired cooling rate of the thermoplastic polymer displaced into the mold cavity to produce a molded part having uniformly distributed molecular orientation of the thermoplastic polymer within the molded part; and
i) applying back pressure to the movable mold member as the thermoplastic polymer in the mold cavity cools to reduce the volume of the mold cavity as the volume of the thermoplastic polymer in the mold cavity shrinks due to cooling.

2. The process as in claim 1 wherein said back pressure exerted against the moveable mold member acting on the polymer in the mold cavity as it cools is at least 2000 psi.

3. A process for molding a thick walled part from a high performance thermoplastic polymer comprising the steps of:
a) providing a plasticizing vessel;
b) providing a mold having a stationary mold member and a moveable mold member cooperatively forming a mold cavity; the moveable mold member moveable relative to the stationary mold member to vary the volume of the mold cavity for forming a relatively thick walled part; said mold having at least one mold heater for heating said stationary mold member and said moveable mold member;
c) filling at least a portion of said plasticizing vessel with granules of a selected high performance thermoplastic polymer;
d) heating at least a portion of the granules in the plasticizing vessel to an injection temperature of the selected thermoplastic polymer;
e) operating the at least one mold heater to heat the stationary mold member and the moveable mold member to a temperature approximately equal to the injection temperature of the selected thermoplastic polymer prior to injection of the selected thermoplastic polymer therein;
f) connecting said mold to said plasticizing vessel;
g) displacing at least a portion of the selected thermoplastic polymer heated to the injection temperature out of the plasticizing vessel and against the moveable mold member under a forwardly directed pressure while simultaneously applying back pressure to the moveable mold member to resist expansion of the volume of the mold cavity, wherein the forward pressure of the displaced portion of the selected thermoplastic polymer acting against the movable mold member exceeds the back pressure by an amount sufficient to cause the moveable mold member to move against the back pressure and the volume of the mold cavity to expand in direct proportion to the amount of the selected thermoplastic polymer displaced into the mold cavity; and wherein said back pressure exerted by said movable mold member is sufficient to remove or prevent formation of substantially any air voids and pores in said selected thermoplastic polymer injected into the mold cavity created by the internal gas pressure of said selected thermoplastic polymer;
h) separating the mold from the plasticizing vessel;
i) using a control system to operate at least one mold heater to selectively heat the stationary mold member and the moveable mold member to provide equal cooling rates for the stationary and moveable mold members to provide uniform cooling at a desired cooling rate of the thermoplastic polymer displaced into the mold cavity to produce a molded part having uniformly distributed molecular orientation of the thermoplastic polymer within the molded part; and
j) applying back pressure to the movable mold member as the polymer in the mold cavity cools to reduce the volume of the mold cavity as the volume of the polymer in the mold cavity shrinks due to cooling.

4. The process as in claim 3 wherein said back pressure exerted against the moveable mold member acting on the polymer in the mold cavity as it cools is at least 2000 psi.

5. The process as in claim 1 wherein said back pressure applied to the moveable mold member to resist expansion of the volume of the mold cavity during the step of displacing at least a portion of the selected thermoplastic polymer out of the plasticizing vessel is generally constant.

6. The process as in claim 3 wherein said back pressure applied to the moveable mold member to resist expansion of the volume of the mold cavity during the step of displacing at least a portion of the selected thermoplastic polymer out of the plasticizing vessel is generally constant.

* * * * *